United States Patent [19]

Gort et al.

[11] 4,335,306

[45] Jun. 15, 1982

[54] SURVEYING INSTRUMENT

[75] Inventors: Alfred F. Gort, Loveland, Colo.;
Charles E. Moore, Rochester, N.Y.

[73] Assignee: Hewlett-Packard Company, Palo Alto, Calif.

[21] Appl. No.: 89,007

[22] Filed: Oct. 29, 1979

Related U.S. Application Data

[62] Division of Ser. No. 842,864, Oct. 17, 1977, abandoned, which is a division of Ser. No. 742,938, Nov. 18, 1976, Pat. No. 4,108,539.

[51] Int. Cl.³ .............................................. G01D 5/34
[52] U.S. Cl. .............................. 250/231 SE; 340/347 P
[58] Field of Search ........ 250/231 SE, 231 R, 237 G; 356/395; 340/347 P; 356/152

[56] References Cited

U.S. PATENT DOCUMENTS 4,064,504 12/1977 LePetit et al. .................. 340/347 P
4,194,184 3/1980 Hartman et al. .............. 250/231 SE Primary Examiner—David C. Nelms
Attorney, Agent, or Firm—Edward L. Miller

[57] ABSTRACT

A tacheometer includes two angle encoders each utilizing a method of eccentricity correction wherein three detectors responsive to encoded angular displacement are arranged linearly along a line passing through the desired axis of angular displacement. Two of the detectors are disposed diametrically opposite each other, at equal distances from and on opposite sides of the desired axis. In the absence of eccentricity the actual axis of angular displacement is the desired axis, and the outputs of the diametrically opposed detectors are complementary. The presence of eccentricity causes the two axes to separate, and produces a corresponding change in the outputs of the diametrically opposed detectors, rendering them non-complementary. The degree of change is measured and used to correct an angular displacement detected by the third detector, located at a different distance from the desired axis.

10 Claims, 30 Drawing Figures

Note 1  Blank areas are metalized. Black areas are transparent.

Note 2  RADIAL SLIT TRACK is a bar pattern with 4096 bars and spaces of equal width and a 3mm radial height.

Note 3  SINUSOIDAL TRACK is a transparent track sinusoidally modulated in width. The pattern is repeated 128 times on a diameter of 44.0 mm.

Note 4  8 DIGITAL TRACKS incorporate a GRAY-CODE.

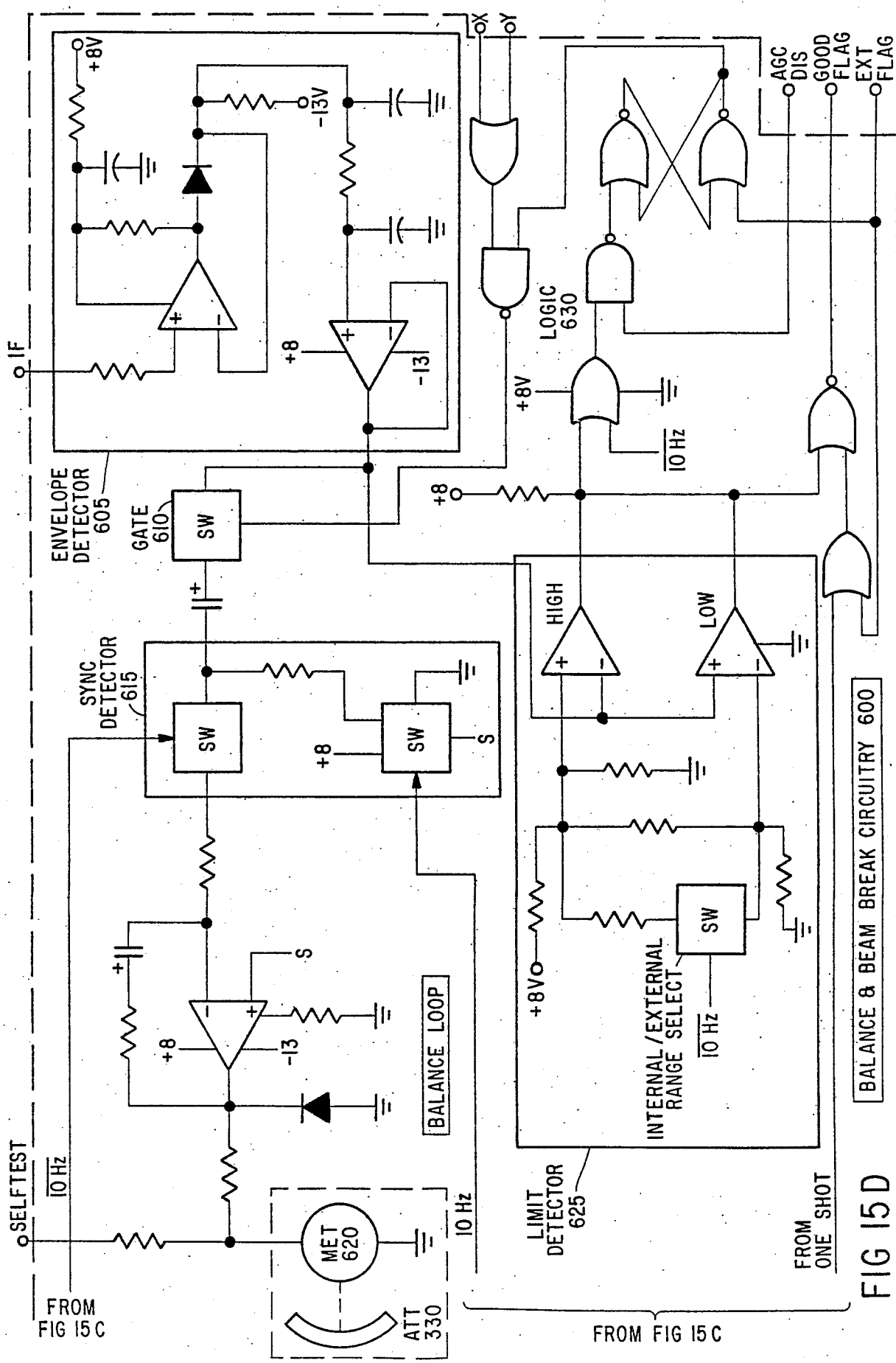

SURVEYING INSTRUMENT

This case is a division of application Ser. No. 842,864, filed Oct. 17, 1977, now abandoned entitled SURVEYING INSTRUMENT, which is a division of application Ser. No. 742,938, filed Nov. 18, 1976, now U.S. Pat. No. 4,108,539, entitled REFLECTING LENS SYSTEM issued Aug. 22, 1978, to Alfred E. Gort and Charles E. Moore.

REFERENCE TO RELATED PATENTS

This application is related to the subject matter of U.S. Pat. No. 3,619,058, entitled DISTANCE MEASURING APPARATUS issued Nov. 9, 1971 to William R. Hewlett and Gregory Justice and to the subject matter of U.S. Pat. No. 3,900,259, entitled TIME INTERVAL PHASE DETECTION IN DISTANCE MEASURING APPARATUS issued Aug. 19, 1975 to Claude M. Mott and Richard J. Clark.

The digital processing modules utilized in this application are related to the subject matter of U.S. Pat. No. 3,863,060, entitled GENERAL PURPOSE CALCULATOR WITH CAPABILITY FOR PERFORMING INTERDISCIPLINARY BUSINESS CALCULATIONS issued Jan. 28, 1975 to Frances Rode et al and to the subject matter of U.S. patent application entitled ADAPTABLE PROGRAMMED CALCULATOR HAVING PROVISION FOR PLUG-IN KEYBOARD AND MEMORY MODULES, filed Dec. 26, 1972 by Freddie W. Wenninger et al.

BACKGROUND AND SUMMARY

Tacheometers, the generic term for theodolite/distance measuring instrument combinations, are powerful surveying tools capable of measuring the angles and the distances between points. Typically, that is done by leveling the instrument, optically aligning a gimbaled telescopic sight upon a target, measuring the shaft angles of the sight once aligned, and measuring the distance between the instrument and the target. Shaft angles can be measured by graduated vernier techniques or by more advanced digital encoding techniques described in more detail in the section below entitled THEODOLITE. Techniques for referencing the instrument to level are also described therein. Techniques for measuring distances include parallax methods as well as phase shift techniques such as described in more detail in the section below entitled DISTANCE MODULE. The major drawback of the prior art in tacheometers has been that a small, lightweight, and highly accurate tacheometer has heretofore been unobtainable.

The present invention utilizes a sinusoidal signal interpolator technique to encode shaft angles and 2 axis level angles as phase shifted signals. The distance module similarly encodes distance as a phase shifted signal, allowing both angle and distance measurements to be decoded by a shared phase detector and accumulator. A processor and keyboard allow an operator to select desired measurement sequences and calculations, including the determination of angles and distances that are corrected for off-level conditions detected by the 2-axis level sensor, refraction, earth curvature, and a speed of light correction factor selected by the operator.

DESCRIPTION OF THE DRAWINGS

FIG. 15a is the waveform of the output from the receiver of FIG. 15.

FIG. 15b is a detailed block diagram of the laser control circuitry of FIG. 15.

FIG. 15d is a detailed schematic of the balance and beam break circuitry of FIG. 15.

SYSTEM ARCHITECTURE

Figure 1:
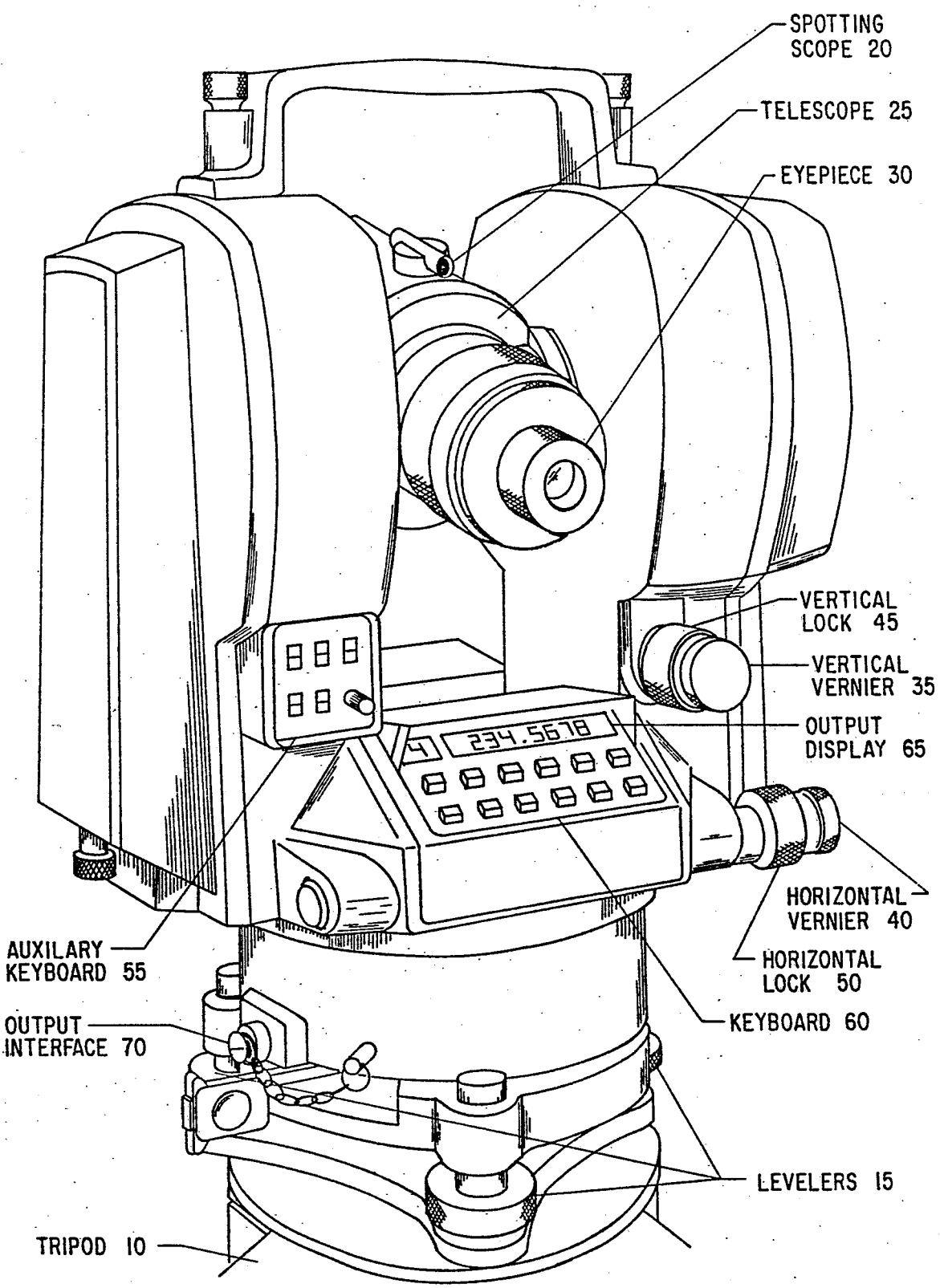
FIG. 1 is a perspective view of a tacheometer constructed in accordance with the preferred embodiment of the present invention.

A tacheometer constructed in accordance with the present invention is illustrated in FIG. 1. The tacheometer is mounted upon a tripod 10 and can be leveled thereon by levelers 15. The operator first sights the target (a cube reflector) through spotting scope 20 and then sights the telescope 25 upon the target through eyepiece 30. Vernier alignment can be made with the vertical vernier 35 and the horizontal vernier 40, and locked in place with vertical and horizontal locks 45 and 50. The operator activates the instrument by switching on a power switch from the auxiliary keyboard 55 and selects the desired measurement sequences via the keyboard 60. The outputs are then displayed on output display 65.

Figure 2:
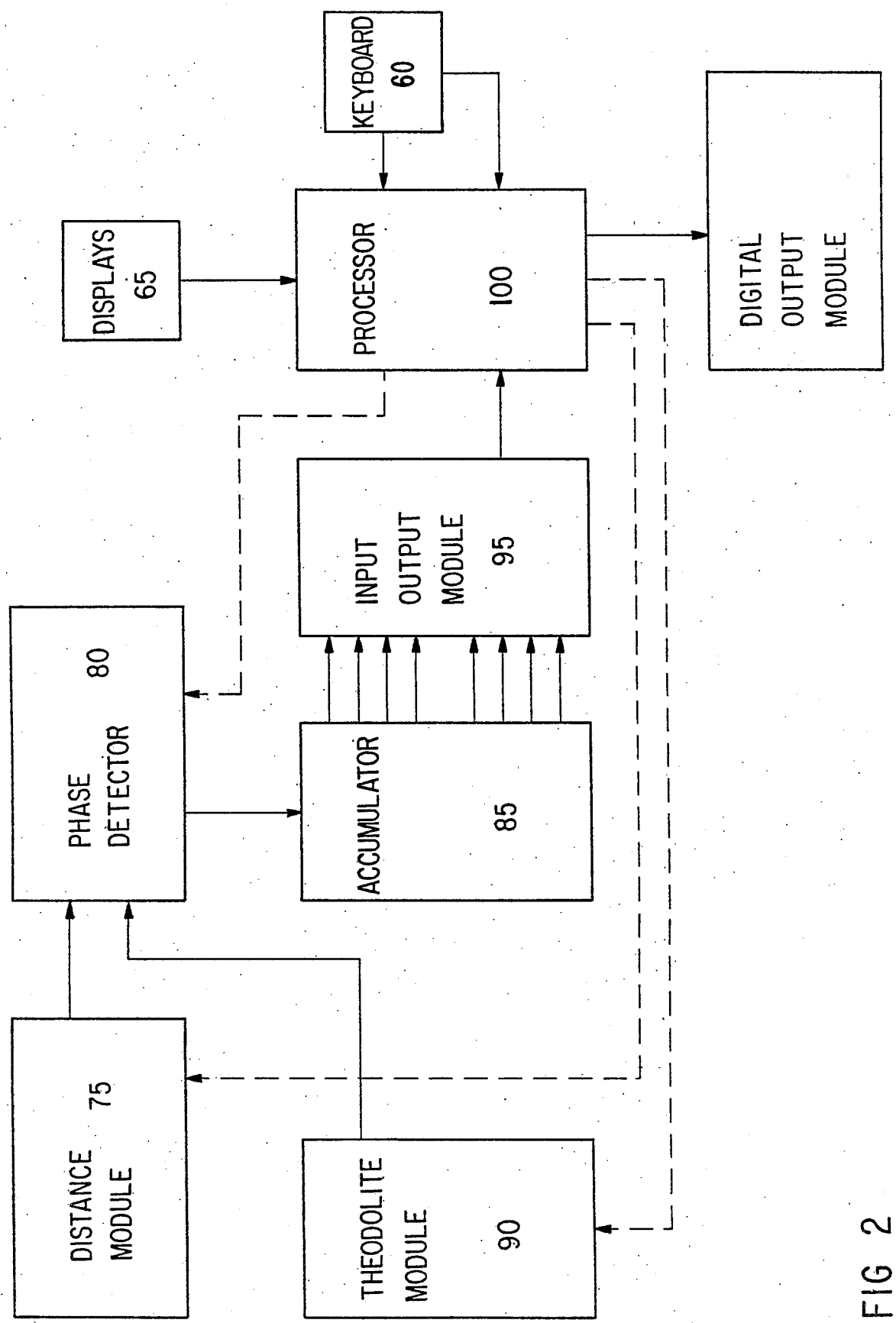
FIG. 2 is a block diagram of the electronics within the tacheometer of FIG. 1.

A block diagram of the tacheometer electronics is shown in FIG. 2. The distance module 75 transmits a modulated light beam downrange to a cube reflector which reflects the beam back to the instrument. The phase shift between the transmitted and received beams is proportional to the distance between the reflector and instrument. This phase difference is measured by the phase detector 80 and accumulator 85. Horizontal and vertical angles are measured by the theodolite module 90. Angles are encoded as phase shifts and also measured by the phase detector 80 and the accumulator 85. The input/output module 95 interfaces the processor 100 with the measurement modules. Measurement sequences are controlled, measurements are accepted, and logical flags are interrogated by the processor. Keyboard 60 provides a control interface with the processor 100 by which the operator may select various measurement sequences and processor calculations. The output appears on the display 65.

KEYBOARD

Figure 3:
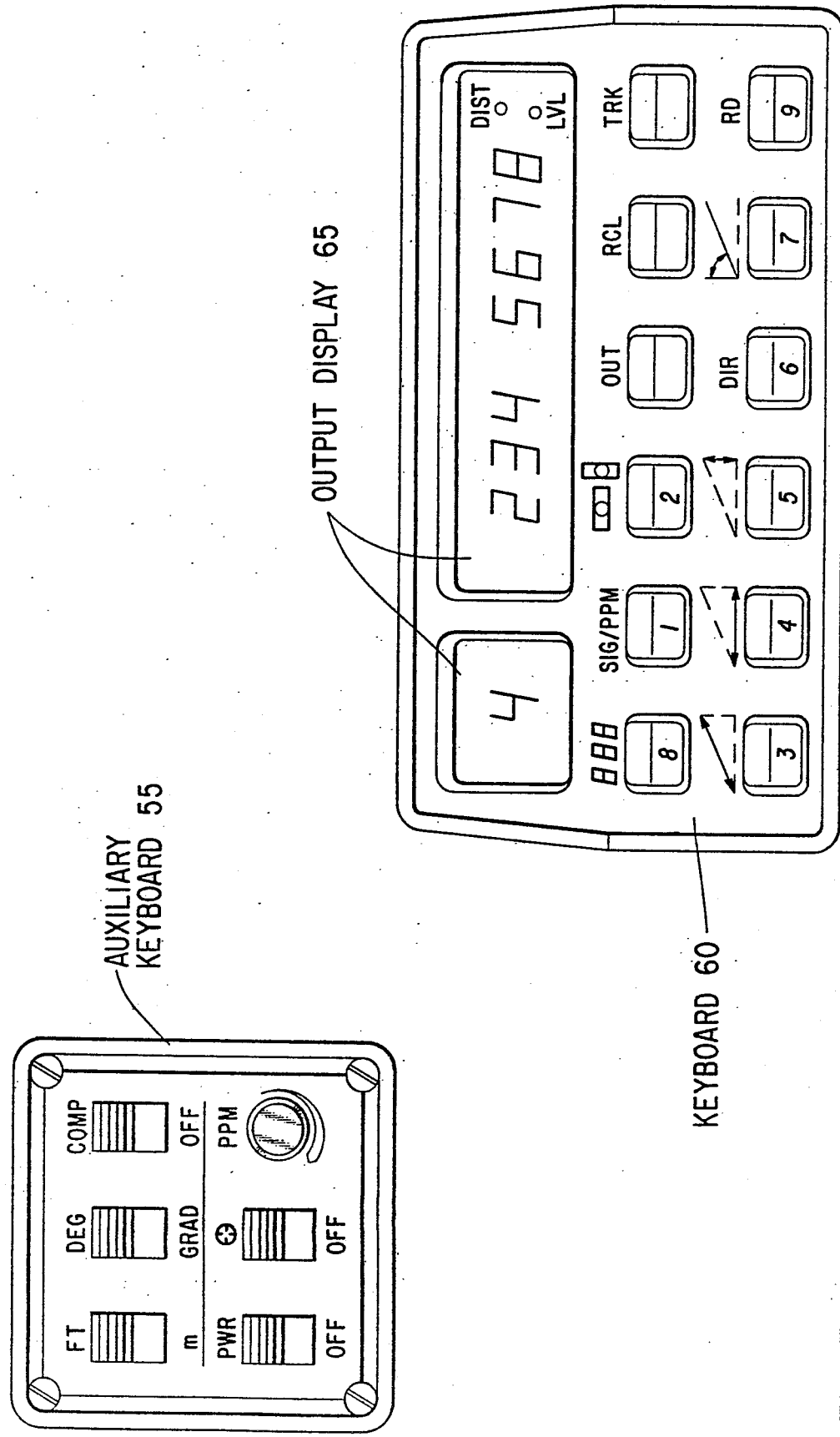
FIG. 3 is an illustration of the keyboards and display of the tacheometer of FIG. 1.

The tacheometer keyboard 60, the auxiliary keyboard 55, and the output display 65, are illustrated in FIG. 3. The tacheometer has two keyboards 60 and two output displays 65, on opposite sides of the instrument, with only one active pair at one time. The auxiliary keyboard 55 comprises switches for selecting an output display of distance converted to feet or meters and angles converted to degrees or grads. The "COMP" switch is used to selectively activate processor compensation of distances and angles for an off-level condition sensed by the 2 axis level sensor, described below in the section entitled LEVEL SENSOR. Power switches for the instrument and the telescope graticule illumination are on the second row of the auxiliary keyboard 55 as is the "PPM" dial for selecting a parts-per-million correction factor to compensate for changes in the velocity of light caused by changes in the index of refraction of air due to variations in the air temperature and pressure. The PPM potentiometer is shown coupled to the environmental correction multistable multivibrator (one shot) 455 in FIG. 17.

Refer now to the 12 key keyboard 60, in FIG. 3. The "DIR" key (#6) measures the angle of the telescope 25 with respect to the horizontal circle ($\theta$) in the theodolite module 90 in FIG. 2. If the COMP switch on the auxiliary keyboard 55 is activated, the processor will correct the reading for out of level. The "RD" key (#9) measures the relative direction by subtracting the last DIR reading from the current reading. This allows an operator to sight on a reference point, push the DIR key, then sight on a second point, push the RD key, and obtain the horizontal angle therebetween. Key number 7 measures the vertical angle ($\phi$) in a manner similar to the function of the DIR key. The vertical measurement is also corrected for an off-level condition when the COMP switch is on. Key number 3 measures the slope distance. The distance module 75 sequences through 3 modulation frequencies. Outputs from these are logically combined to give a readout in either feet or meters on the output display 65. Key number 4 measures the projected distance. The tacheometer measures the slope distance, the vertical angle ($\phi$), and the level angles if the COMP switch is on, then calculates the projected distance. Key number 5 is the elevation difference key. This key performs a sequence similar to the projected distance key but calculates the elevation difference. The projected distance key and the elevation key also correct for earth curvature and refraction. This is required because the gravity vector is not parallel for distant points. The track key "TRK" takes periodic readings from any of the numbered keys. For example, by pushing TRK, then key 3, the tacheometer will measure the slope distance about once a second so that a slowly moving target can be tracked. Key number 2 reads out both level angles simultaneously in either seconds or centicentigrads. Two three-digit numbers are displayed side by side. It is possible to very accurately level the instrument while tracking this function, or simply verify that the instrument is safely within its limits and let the tacheometer compensate internally for off-level condition. Key number one displays the signal strength, obtained from the AGC one shot 450 illustrated in FIG. 17 and discussed in the section entitled PHASE DETECTOR, and the PPM correction dialed in from the PPM control on the auxiliary keyboard 55, side by side. The PPM correction is adjusted by tracking this function while adjusting the PPM pot to obtain the desired correction. Key number 8 is a self-test selector. The tacheometer self checks a set of internal functions and displays all eights on the output display 65 if the test is completed satisfactorily. The basic functions, keys 1, 2, 3, 4, 5, 6, 7, and 9, have dedicated storage locations in memory where the last measurement is stored. For instance, pushing key 4 will measure the level angles, slope distance and vertical angle, then calculate projected distance and elevation difference. By now keying the recall key "RCL" followed by key 2, 3, 5, or 7, the component measurements used in the projected distance measurement can be recovered. The output key "OUT" is used to send the output to a peripheral device. An HP9815 calculator described in copending U.S. patent application Ser. No. 597,957 entitled PROGRAMMABLE CALCULATOR filed July 21, 1975 by Bradley W. Miller et al, can be interfaced with the output interface 70 shown in FIG. 1.

The output display 65 has two indicator lights on the right hand side of the display. The DIST light is on only if a signal is being returned to the distance module, indicating that a distance measurement is in progress. If too strong a signal is being received, the light will also fail to light, indicating to the operator the need to fit an attenuator cap over the reflector. The level sensor light (LVL) flashes if the instrument is outside the range limits of the level sensor and will be on continuously when within range. This light therefore functions as a pilot light also. The first digit of the display (the left hand display) displays the key number of the function processed when an output is displayed to identify the output.

Theodolite

Figure 4:
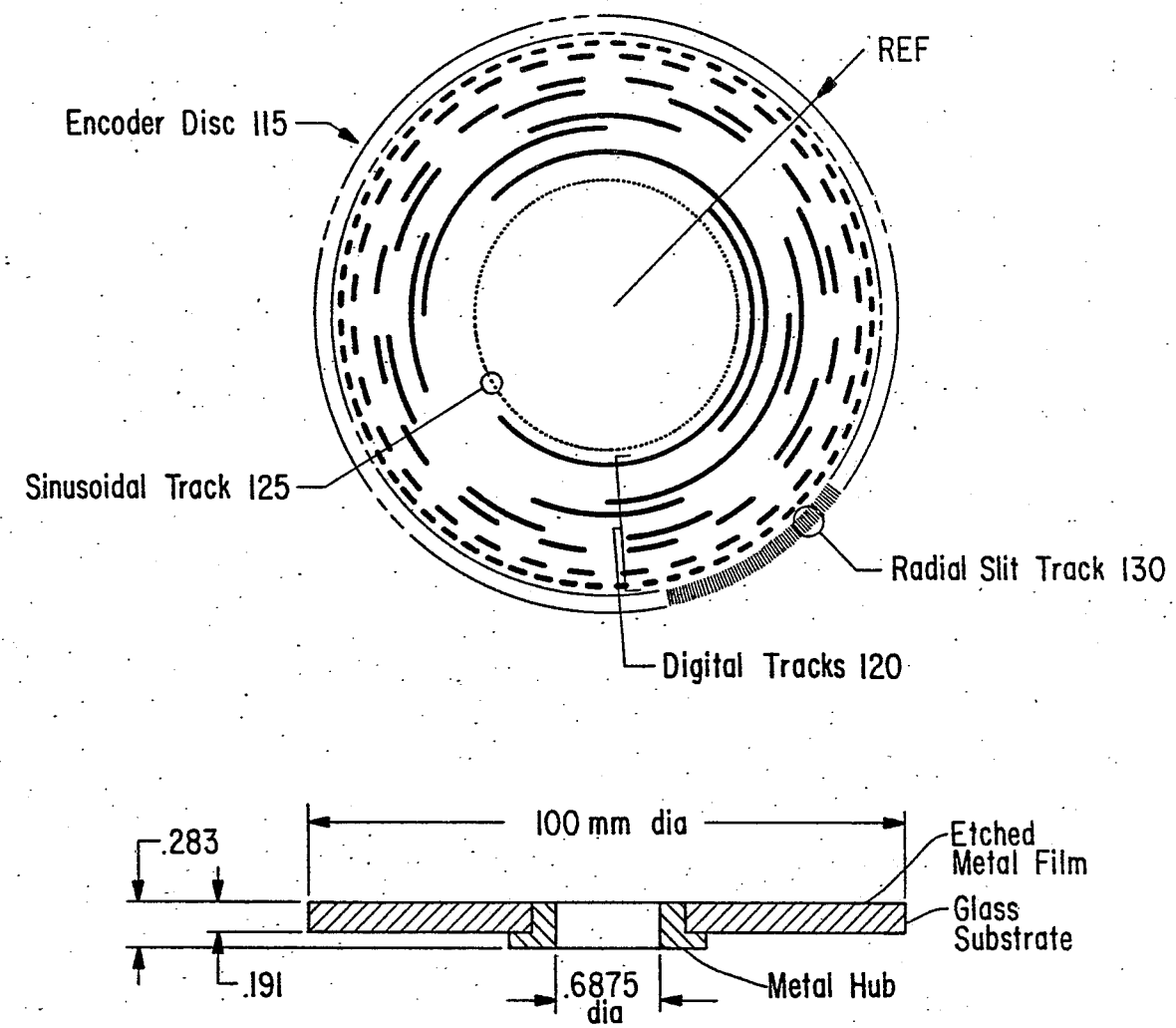
FIG. 4 is an illustration of the encoder disc used in the shaft angle encoders of the tacheometer of FIG. 1.
Figure 4:
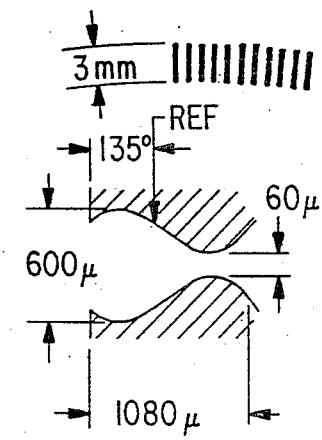
Figure 5:
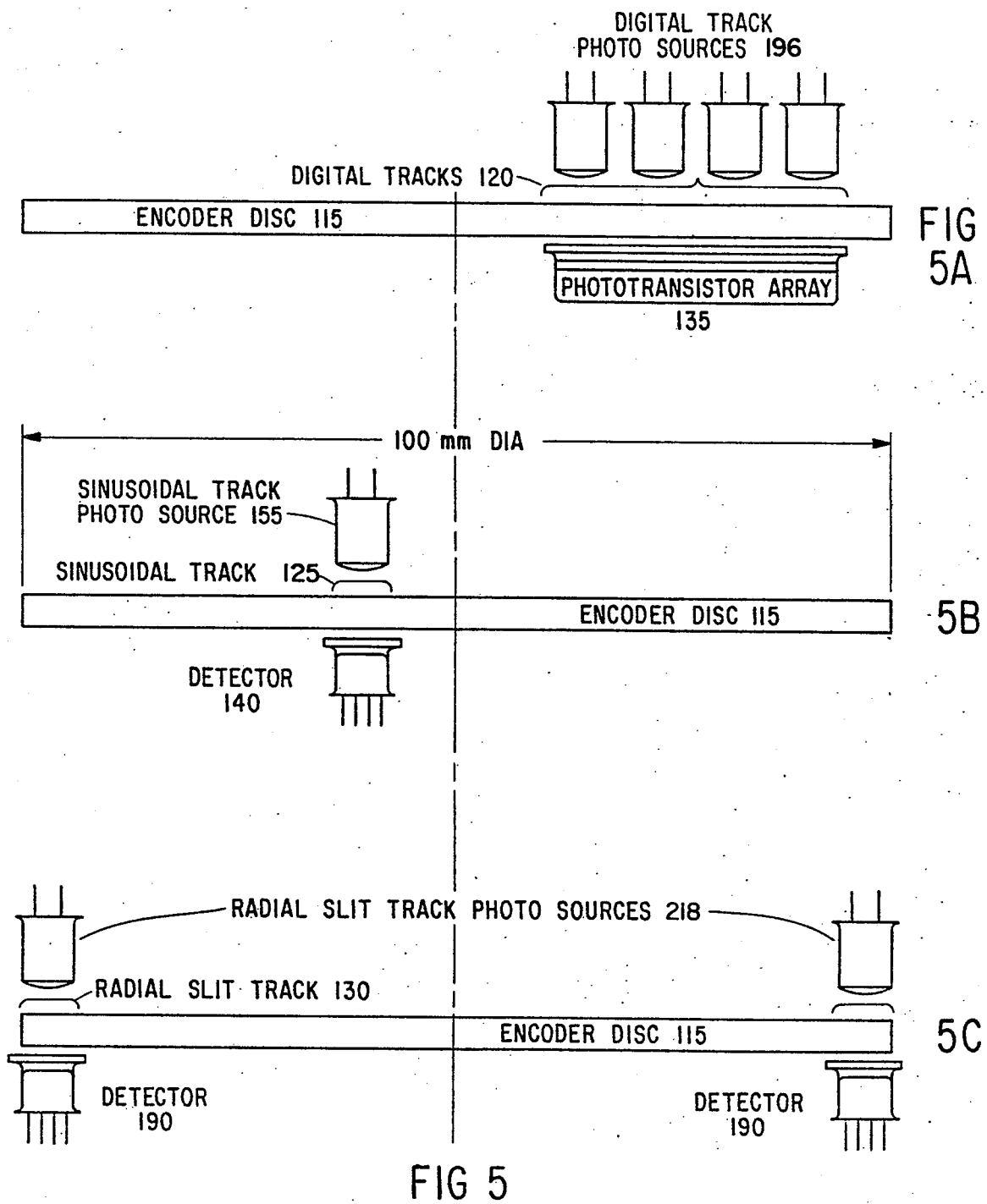
FIGS. 5A–5C illustrate the optical layout of the photosources, the detectors and the encoder disc of FIG. 4.

The function of the Theodolite Module 90 of FIG. 2 of the present invention is to measure the vertical angle phi ($\phi$) and the horizontal angle theta ($\theta$) of the telescope 25 relative to the reference plane of the tacheometer. It is desirable to have a theodolite which is small in size, highly accurate and compatable with digital electronics. Previous theodolites, such as those described in U.S. Pat. No. 3,541,572 issued to V. G. Shults, Nov. 17, 1970 and U.S. Pat. No. 3,675,238 issued to Karl Heinz Butscher on July 4, 1972, are less than optimum solutions to these three requirements. Our theodolite uses two shaft angle encoders, one for the horizontal angle and one for the vertical angle, in combination with a 2 axis level sensor which is used to precisely determine the gravitionally defined level reference plane and to transform the vertical and horizontal measurements obtained from the vertical and horizontal shaft angle encoders to the gravitational plane. The two shaft angle encoders are identical in construction. Each consists of a flat transparent plate (the encoder disc) coated with a optically opaque metallic film defining a plurality of circular tracks thereupon, each track having predefined optical characteristics. The encoder disc 115 is illustrated in FIG. 4. There are three types of circular tracks upon the encoder disc 115; the digital tracks 120, the sinusoidal track 125, and the radial slit track 130. As illustrated in the FIGS. 5A, 5B, and 5C, light is emitted on one side of the encoder disc, transmitted through the circular tracks upon encoder disc 115, and detected upon the opposite side of encoder disc. The decoding of the signals transmitted through the digital tracks 120 gives a rough measurement of the angle to be measured. By logically combining this output with the output detected from the sinusoidal track and the radial slit track this angular measurement is interpolated in two stages to give a final angular resolution of less than 1 arc second.

The eight digital tracks 120 upon encoder disc 115 utilize a Gray Code which is well known to persons skilled in the art of theodolites. This code is characterized by having only one transition per one bit of information. The use of eight separate photo-transistors, denoted as photo-transistor array 135 in FIG. 5A, produces a direct 8 bit Gray Code which can be directly interfaced with a conventional digital processor, giving an angular resolution of approximately 1.4°.

Figure 6:
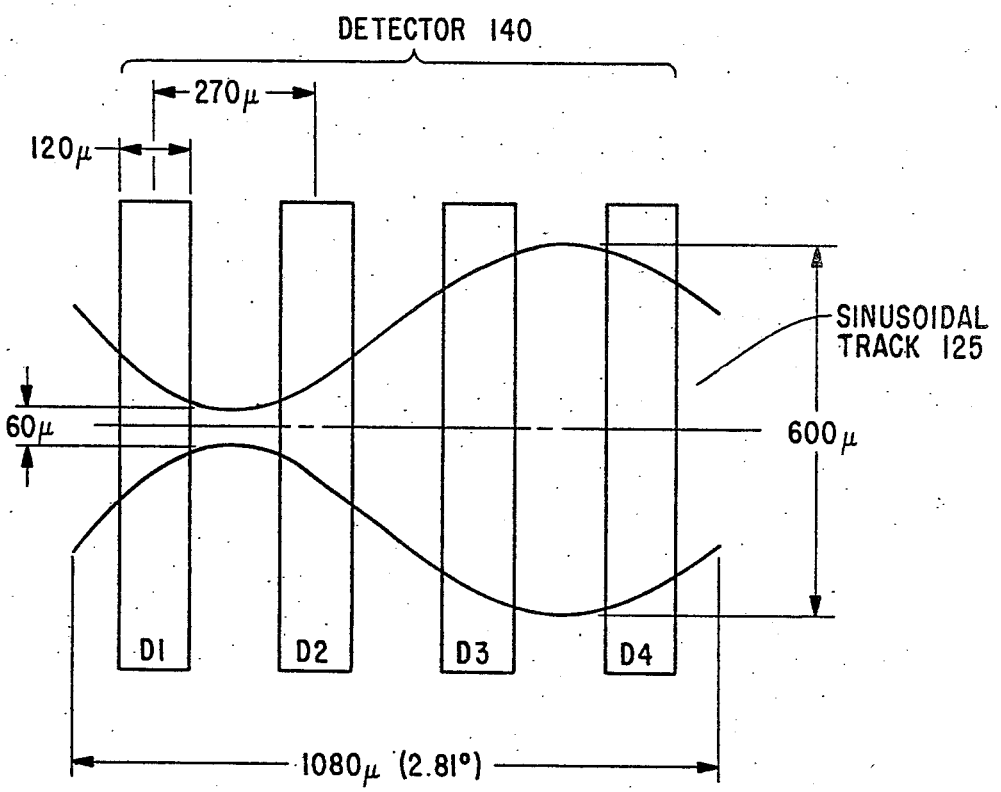
FIG. 6 is an illustration of the sinusoidal track and detector of the encoder disc of FIG. 4.

The sinusoidal track 125 (of FIG. 4) is a 128 period transparent track sinusoidally modulated in width. The detector 140 illustrated in FIG. 5B comprises four rectangular photo-sensitive diodes, D1–D4, upon a single chip spaced 90° apart in respect to the period upon the sinusoidal track 125. FIG. 6 illustrates the relationship between the detector 140 and the sinusoidal track 125. The utilization of the four diode array upon detector 140 allows the use of a differential ratio technique which eliminates offset and gain errors.

Figure 7:
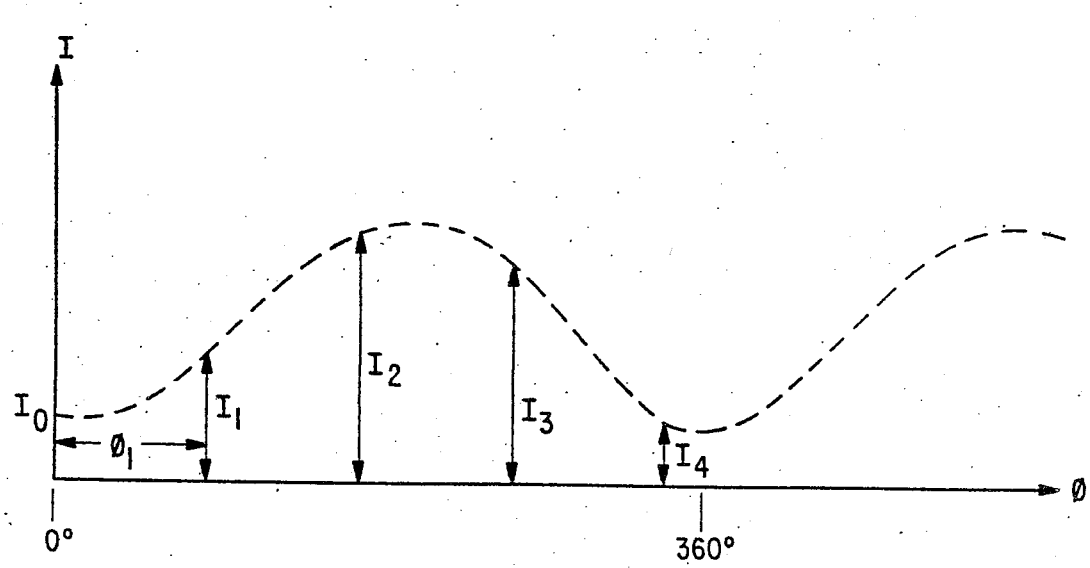
FIG. 7 is a graph of light intensity as a function of angle received by the diode elements of the detector of FIG. 6.

The intensity of the light received by the four diodes in the detector 140 is illustrated in FIG. 7. The eight track digital system described above unambiguously defines the period of the 128 track sinusoidal pattern to be interpolated. The interpolation angle, $\phi_1$, to be measured, is related to the intensities detected by the four diode detectors in detector 140 by the following relationships:

$$I_1 = I_0 + \sin \phi_1$$

$$I_2 = I_0 + \sin (\phi_1 + \pi/2) = I_0 + \cos \phi_1$$

$$I_3 = I_0 + \sin (\phi_1 = \pi) = I_0 - \sin \phi_1$$

$$I_4 = I_0 + \sin (\phi_1 + 3\pi/2) = I_0 - \cos \phi_1$$

Figure 8:
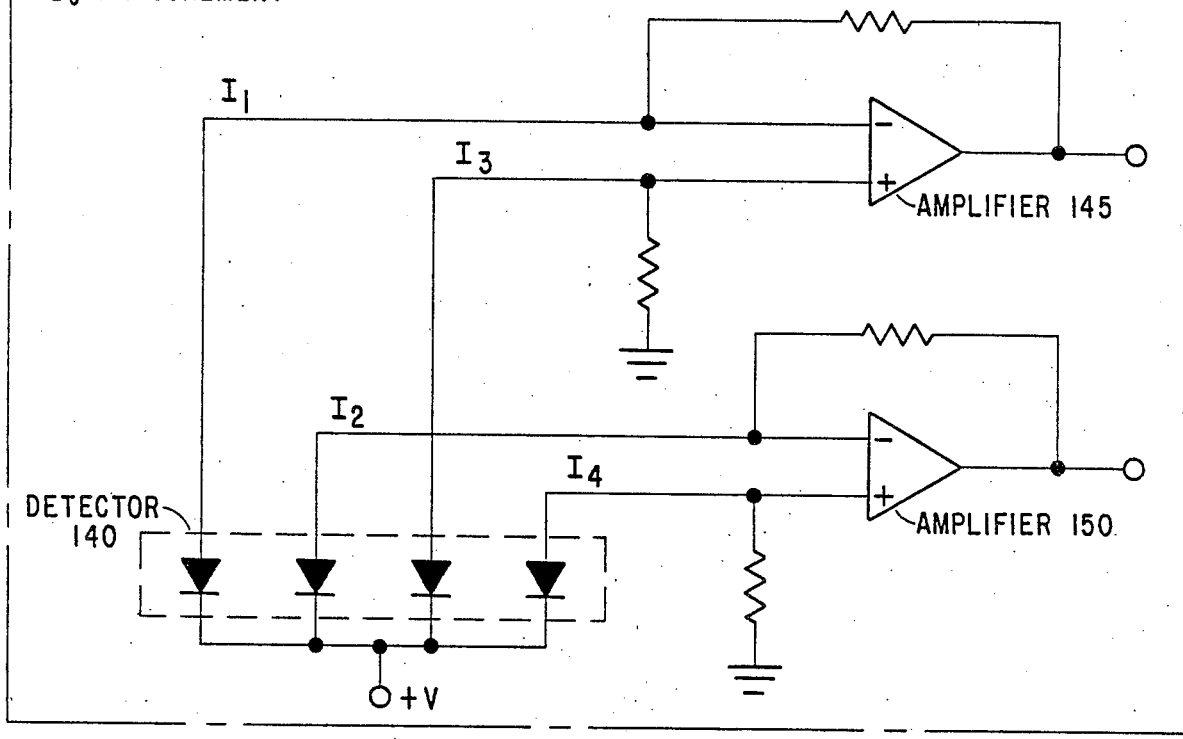
FIG. 8 is a detailed schematic of the sinusoidal track decoder.

Referring now to FIG. 8, the outputs $I_1$ and $I_3$ from the first and third diodes in detector 140 and the outputs $I_2$ and $I_4$ from the second and fourth diodes in detector 140 are differenced in amplifiers 145 and 150 respectfully.

$$I_1 - I_3 = 2 \sin \phi_1$$

$$I_2 - I_4 = 2 \cos \phi_1$$

The sinusoidal track photo source 155 (in FIG. 5) is modulated with a signal proportional to sin $\omega t$, (375 Hz), thus the two signals output from amplifiers 145 and 150 are:

$$A \sin \phi_1 \sin \omega t \text{ and}$$

$$A \cos \phi_1 \sin \omega t_1 \text{ respectively.}$$

Figure 9A:
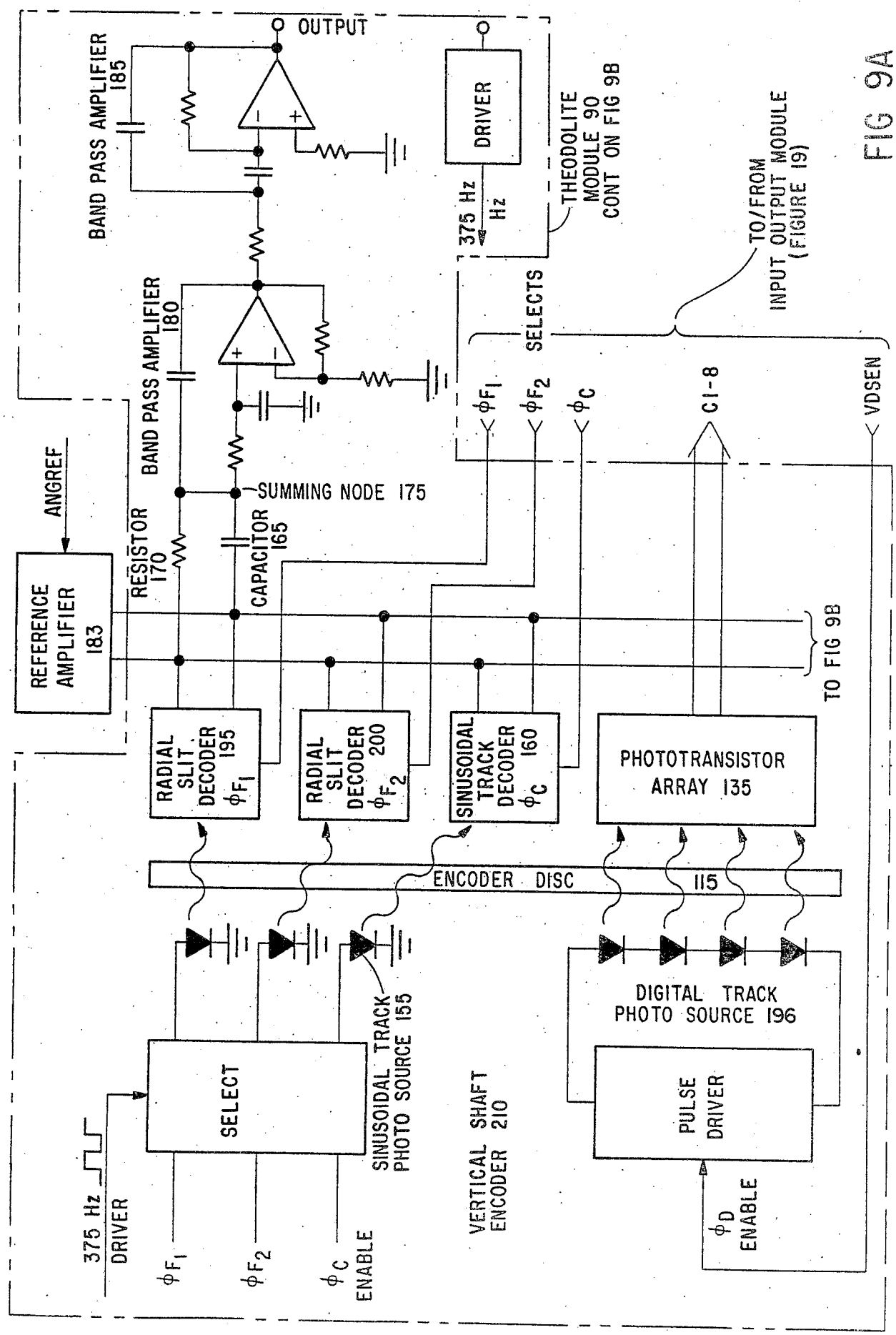
FIGS. 9A and 9B are detailed block diagrams of the theodolite module of FIG. 2.
Figure 9B:
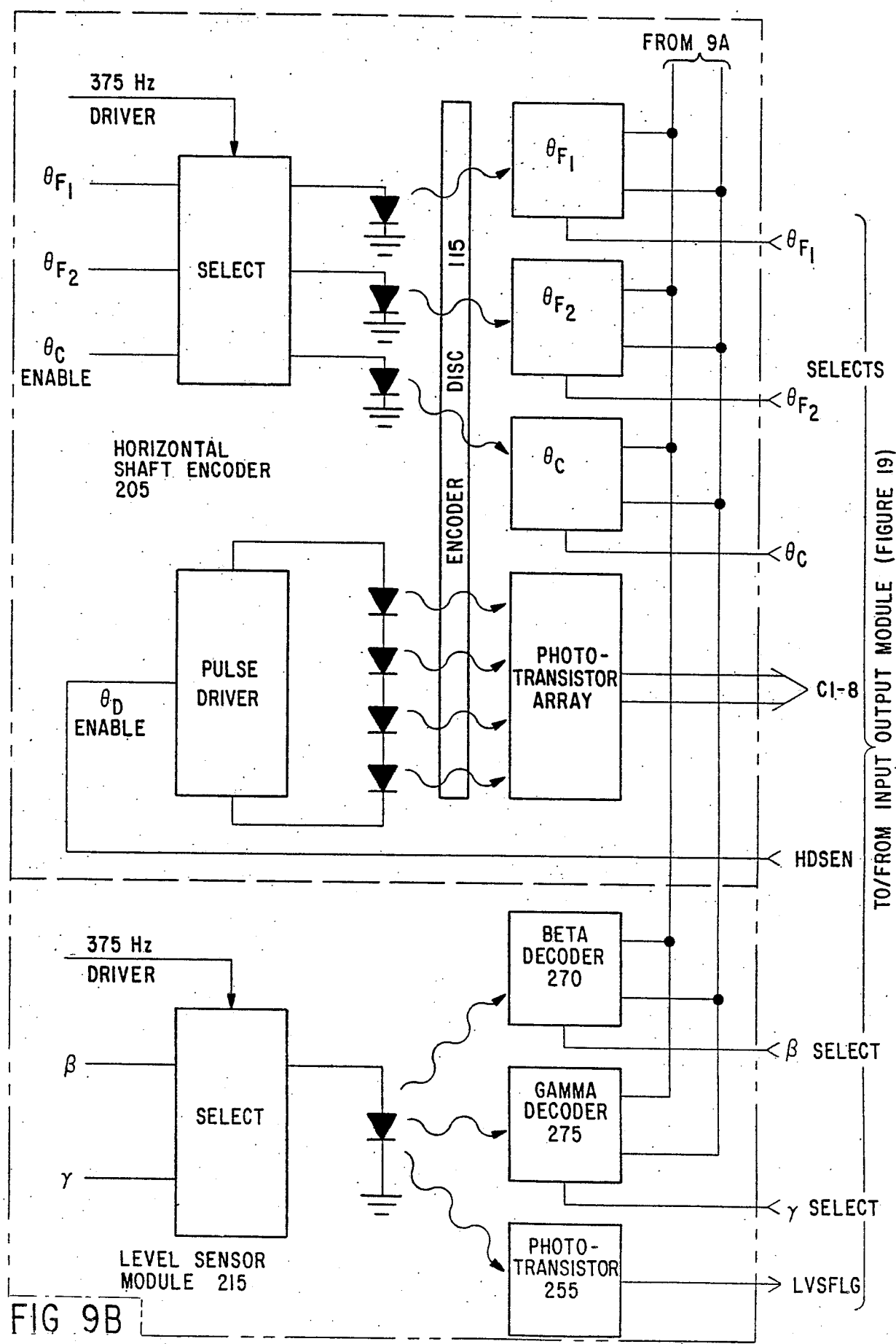

Referring now to FIG. 9, the sinusoidal track decoder 160 illustrated in FIG. 8 is now shown interconnected within the theodolite module 90. A first output signal from sinusoidal track decoder 160 is coupled to capacitor 165. The capacitor introduces a 90° phase shift to the signal. The second signal output from the sinusoidal track decoder 160 is coupled to resistor 170, which matches the impedance of capacitor 165 but introduces no phase shift. The two signals are subsequently summed at summing node 175. The phase shift and the summing result in an output signal which is proportional to:

$$A \sin (\omega t + \phi_1).$$

The phase difference between the signal (sin $\omega t$) modulating the sinusoidal track photo-source 155 and the signal at the summing node 175 (sin ($\omega t + \phi_1$)) is therefore directly proportional to the angle $\phi_1$, the interpolation angle desired. In the current embodiment, the driver modulation of the sinusoidal track photo-source 155 is a 375 Hz squarewave. Since the squarewave introduces high order harmonics, two band-pass amplifiers 180 and 185 are used to suppress the undesired harmonics and retain only the desired fundamental frequency. The output of band-pass amplifier 185 therefore is a sinewave shifted in phase by an amount proportional to the angular displacement to be measured, having a peak-to-peak voltage of approximately 2 volts. As can be seen from FIG. 9, the resistor 170, capacitor 165 and band-pass amplifiers 180 and 185, are time shared between the various decoder assemblies in the Theodolite Module 90.

Figure 10:
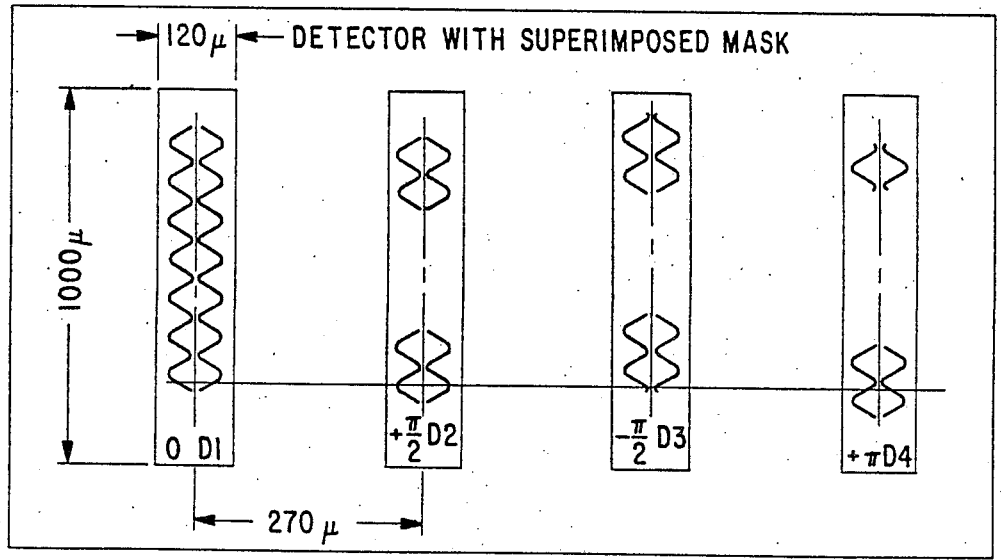
FIG. 10 is an illustration of the radial slit track detectors of FIG. 5.
Figure 10:
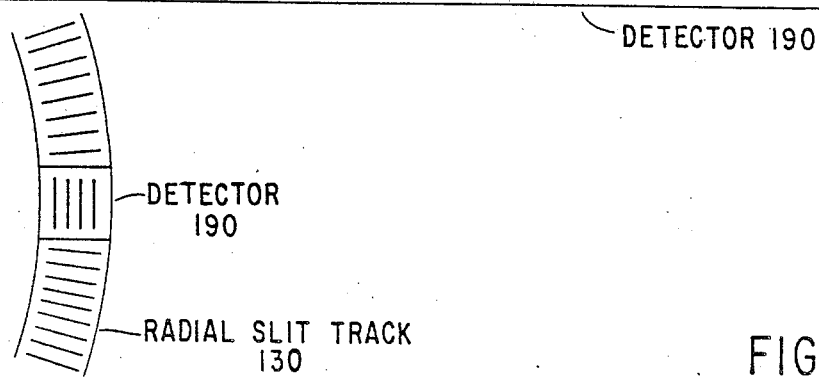

A second order interpolation is implemented upon the radial slit track 130 of FIG. 4. The technique is the same as described as used for the decoding of the sinusoidal track 125, except in the case of the radial slit track 130, the circular track comprises 4096 bars and slits and the detectors 190 comprise four photo-diodes each with a superimposed sinusoidal mask thereupon. As illustrated in FIG. 10, each detector diode has a mask comprising 13 sinusoidal periods, such that the output amplitude is averaged over 13 periods. This reduces the sensitivity to dust and improves the accuracy since it averages out pattern imperfections over the thirteen periods. The diode masks are shifted by increments of 90° with respect to the period of one bar and space. The diode elements D1–D4 are offset 90° apart in phase in respect to the radial slit track 130. The same detector is used as on the sinusoidal track 110, except for the sinusoidal overlay mask. Referring to FIG. 9, two radial slit decoders 195 and 200 are illustrated. These decoders are spaced 180° apart upon the radial slit track 130, and the average value of the two readings is used to indicate the actual phase angle upon the radial slit track 130. The difference between the two outputs from the radial slit decoders 195 and 200 is also used to correct for eccentricity errors, described below.

The horizontal shaft angle encoder 205 illustrated in FIG. 9 is identical in operation to the vertical shaft angle encoder 210 which has been described above.

Figure 11:
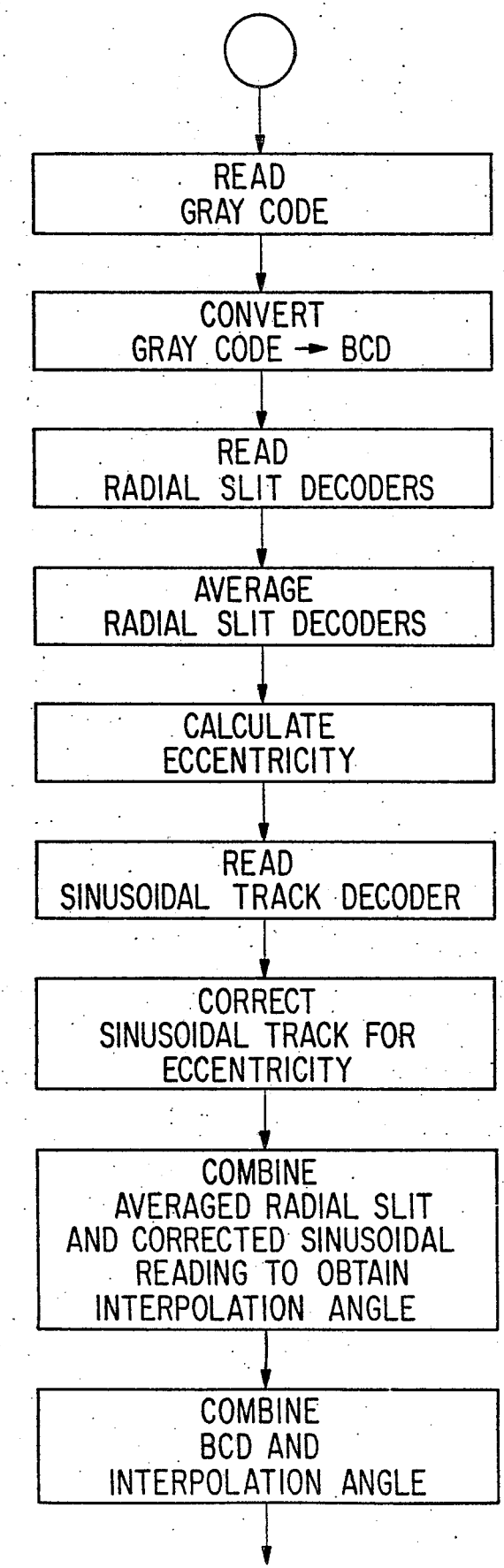
FIG. 11 is a flow chart for combination of the angular measurements.

Referring to FIG. 9, the processor will sequentially enable the decoders and the corresponding photosources for the measurement it requires via the 'select' lines. The outputs from the Gray Code on the phototransistor arrays, such as photo-transistor array 135, will be directly output to the input/output section of the processor on data lines C1–C8. The outputs from the sinusoidal and radial slit decoders such as decoders 160, 195 and 200 will be multiplexed upon the shared output to the phase detector 80. The algorithm for combining the Gray Code, the sinusoidal track information, and the radial slit track information, is shown in FIG. 11. First the digital Gray Code is read and converted to a binary coded decimal. The two radial slit outputs are read, averaged and the eccentricity correction required is calculated. Next the sinusoidal track information is read, corrected for the eccentricity error detected above, and then combined with the radial slit track information and the Gray Code angle to unambiguously define the shaft angle to a resolution of better than 1 arc-second.

Band-pass amplifiers 180 and 185 inherently introduce a certain amount of phase shift which may vary as a function of time and temperature. This shift is measured by introducing the 375 Hz squarewave directly via reference amplifier 183 during a reference measurement cycle. A correction is applied to subsequent measurements by the processor.

Figure 12:
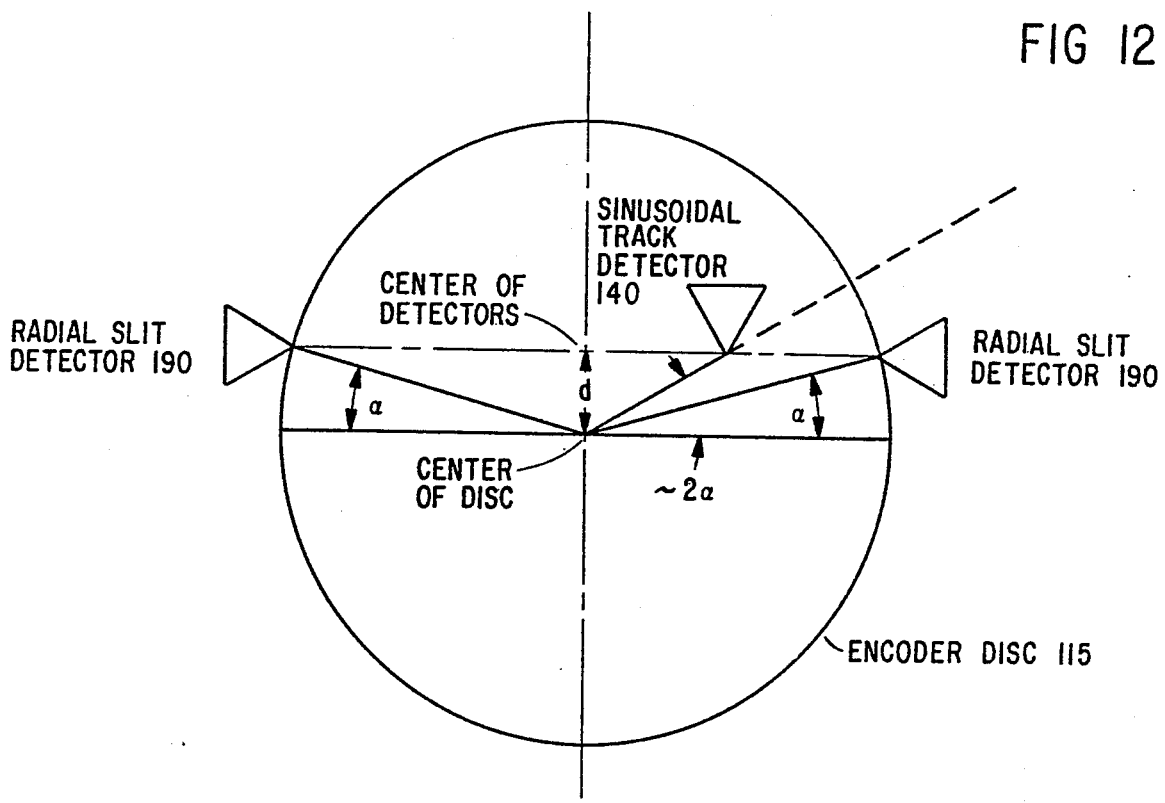
FIG. 12 is an illustration of the eccentricity error measurement.

Eccentricity errors can be caused by bearing clearance, misalignment of the encoder disc on the shaft and artwork errors on the encoder disc. The eccentricity effects that we are concerned about in the present invention are on the order of a 1 mil, where the outer track is only 3 mils in period. A 1 mil uncertainty in the interpolation of the sinusoidal track may result in the incorrect selection of the proper period on the radial slit track, so the sinusoidal track detection needs to be corrected for the eccentricity effects. We are measuring this with the fine resolution of the radial slit tracks. The eccentricity is measured by taking the difference between the two radial slit track measurements. If there is no eccentricity, the measurements will be exactly 180° apart. If there is an eccentricity error, as illustrated in FIG. 12, the true center of the encoder disc 115 will be displaced by a distance d from the center axis of the detectors and the radial slit track measurements will not be displaced by exactly 180°, but will be displaced by an angle approximately $2\alpha$ smaller than 180°. On FIG. 12, extrapolating a line radially out from the center of encoder disc 115 through the sinusoidal track detector 140 would result in an error of determining the period of the radial slit track 130 to be interpolated. The angular displacement of the sinusoidal track detector 250 is approximately $2\alpha$, therefore correcting the measurement from detector 140 by $2\alpha$ results in a correction of the eccentricity error without the requirement for a second sensor on the sinusoidal track. This requires, of course, that the three sensors, the two for the radial slit track and the one on the sinusoidal track, be linearly aligned. The calculations and corrections for the eccentricity are all done by the processor as is the combining of the angular measurements.

Level Sensor

The function of the level sensor 215, shown in FIG. 9, is to measure the angular orientation of the instrument relative to a gravitational defined level, so that the vertical and horizontal angles which have been detected by the vertical and horizontal shaft encoders 205 and 210, can be transformed to a gravitational reference plane. The mathematics for correcting the vertical and horizontal angles once the true level has been determined by a 2 axis level sensor is a straight forward application of spherical geometry. See for example the section of "Relations in any Spherical Triangle" in the Chemical Rubber Company's standard mathematical tables 14th Edition, published in 1964 by the Chemical Rubber Company. The use of a level sensor to correct the vertical and horizontal angles measured by a theodolite, as taught by the present invention, furthers the objectives of the present invention by allowing the theodolite to self compensate for out-of-level conditions.

Figure 14:
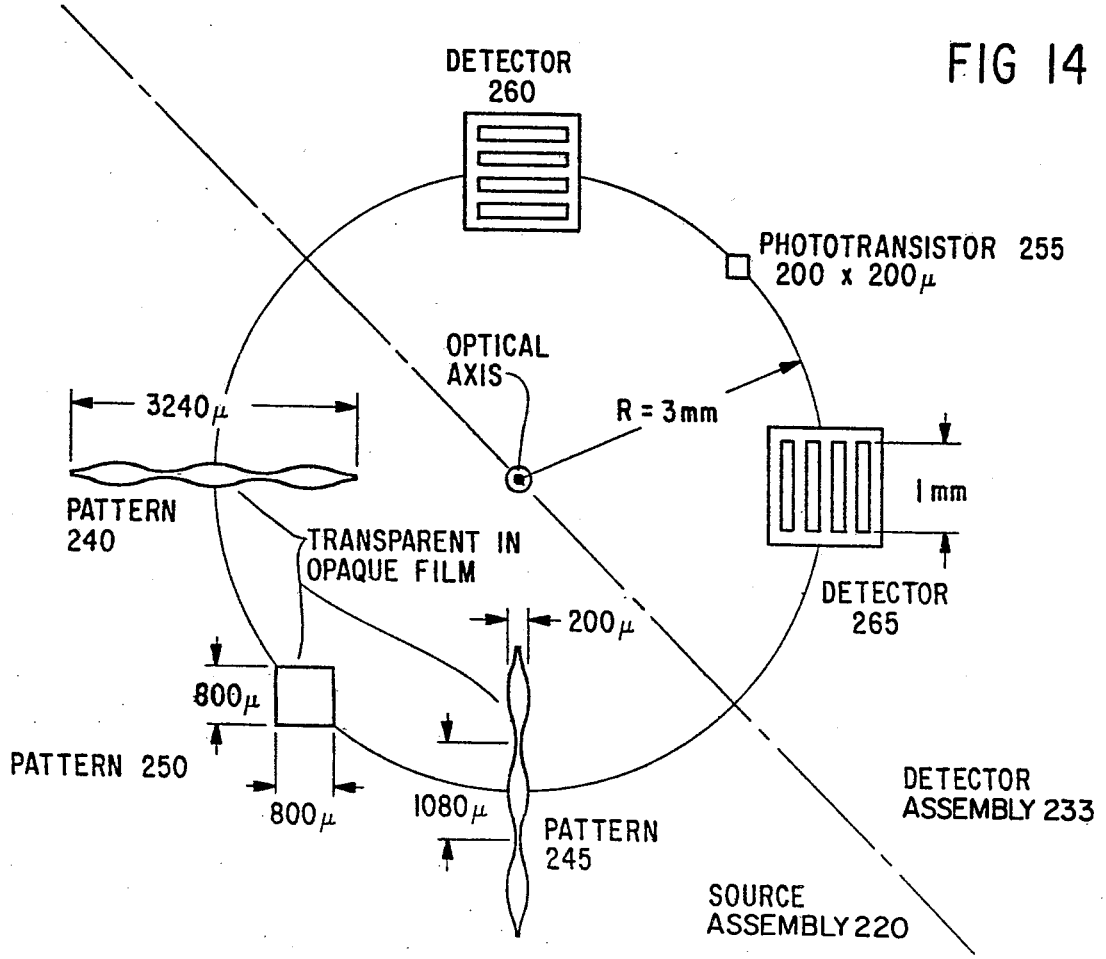
FIG. 14 is a detailed illustration of the detector and source assemblies of FIG. 13.
Figure 13:
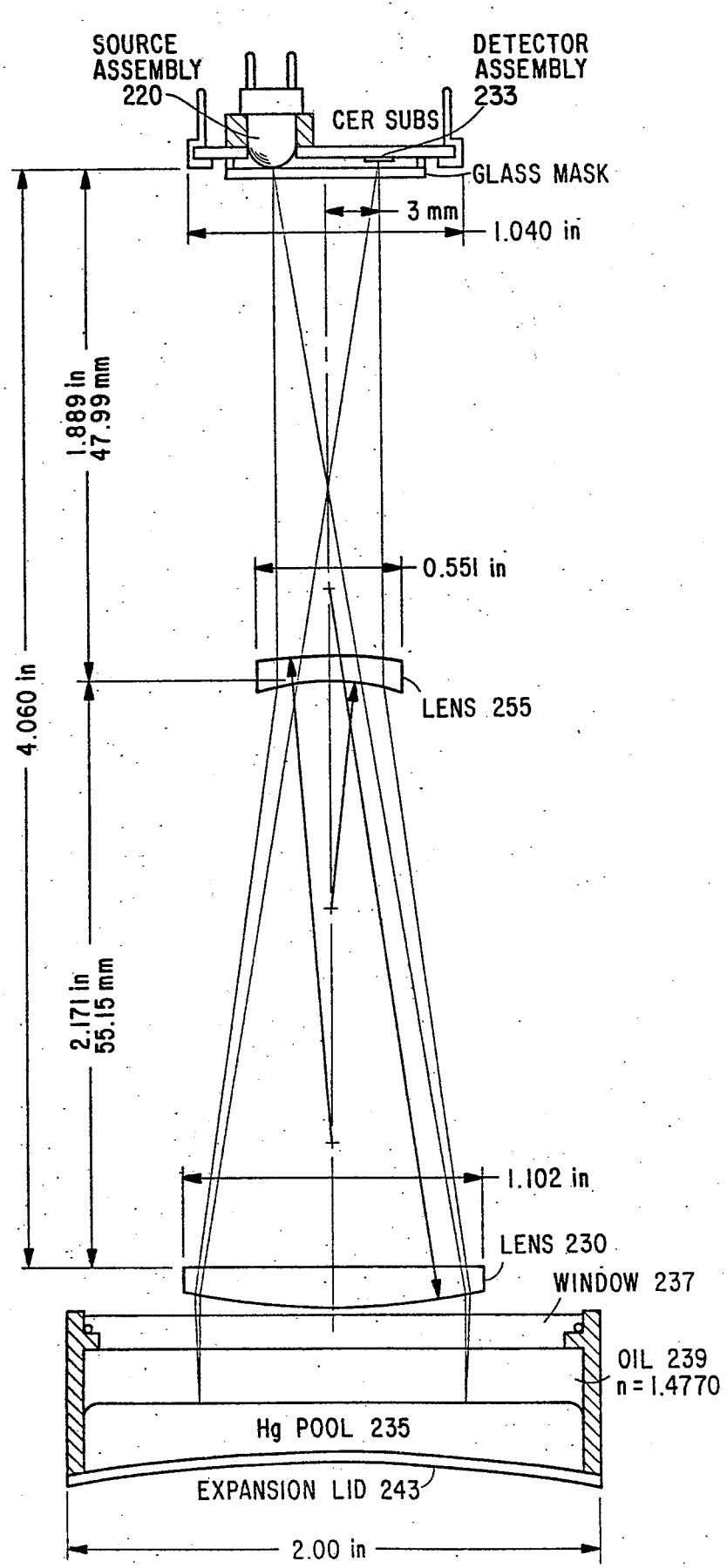
FIG. 13 is an illustration of the optical layout of the level sensor of the theodolite of FIG. 9.

The accuracy of theodolites in the prior art is dependent upon the accurate leveling of the theodolite assembly itself, using the prior art leveling techniques such as bubbles or pendulum methods such as that described in U.S. Pat. No. 3,617,131 issued to Hiromi Taguichi, Nov. 2, 1971. The present invention uses a lens to collimate a beam of light which is reflected from a mercury pool and then focused on a detector assembly. The displacement of the source image upon the detector assembly due to the gravitionally determined plane of the mercury pool provides a measure of the angular displacement of the theodolite assembly from the gravitional reference on 2 axes. Referring to FIG. 13, the source assembly 220 produces an image which is transmitted through lens 225 and collimated by lens 230. the collimated source image is reflected from mercury pool 235 which provides a gravitationally defined reference plane. The reflected source image is thereupon transmitted through lens 230 and and lens 225 and focused upon the detector assembly 235 which is symmetrically disposed in relation to the source assembly 220 about the symmetrical axis of the lens system. The function of lens 225 is to keep the dimensions of the instrument package small. The displacement measurement technique is identical to that described above in the discussion of the shaft angle encoders. FIG. 14 shows the detector assembly 233 and the source assembly 220 constructed upon a single plane. The source assembly 220 has three patterns thereupon. Two of the patterns are on orthogonal axes for determining the level of the assembly. One is denoted the gamma axis pattern 240, the other is denoted the beta axis pattern 245. A third pattern 250 is a rectangular pattern used to determine whether the level sensor is within the limits of its detection capabilities. The present level detector has a range of approximately ±3 min. from true level. The detectors are symmetrically disposed from the center axis of the lens assembly upon a radius of approximately 3 mm relative to the source patterns on the source assembly 220. The photo-transistor 255 will output a signal if the level sensor is within range limits. The beta axis and the gamma axis detectors 260 and 265 will output an array of signals from which the beta and gamma angular displacement of the true gravity vector can be determined by the method previously defined in the shaft angle encoder technique. Referring now to FIG. 9, the processor will select a measurement upon either the beta or the gamma axis which will be decoded by decoder 270 or 275. The photo-transistor 255 will output a signal upon the flag LVSFLG if the level sensor is within its limits. If a beta or a gamma measurement is desired, the 375 Hz squarewave driver signal will be applied to the photosource which will emit the appropriate source patterns, and the beta or the gamma decoder assembly will be activated. The output will be multiplexed upon the output lines shared with horizontal shaft encoder 205 and the vertical shaft encoder 210, through resistor 170 and capacitor 165 and band pass amplifiers 180 and 185 to the phase detector 80.

The mercury pool 235 of FIG. 13 is designed to produce a level and highly reflective plane. A layer of transparent silicon oil 239 having a low viscosity temperature coefficient (VTC) is used to damp vibrations. A glass window 237 over the mercury/oil pool eliminates any air bubbles from existing between the glass surface and the pool. An expansion lid 243 allows for thermal expansion and contraction of the pool. Finally, the coated glass window 237 has a low reflectivity, ~1.0% as compared to ~4.0% for uncoated glass, to prevent stray reflections which are detrimental to accuracy.

Distance Module

Figure 15:
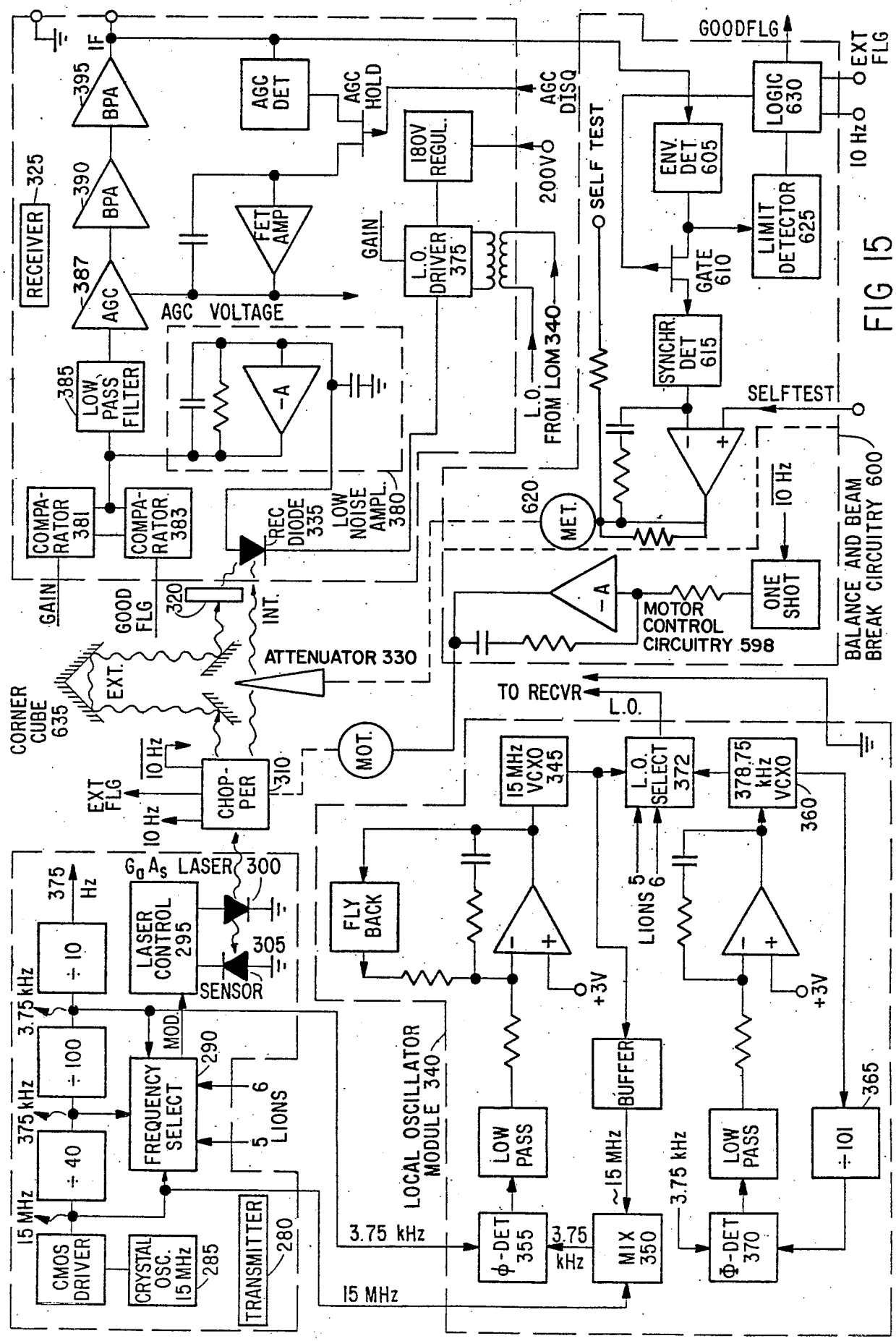
FIG. 15 is a detailed block diagram of the distance module of FIG. 2.
Figure 16:
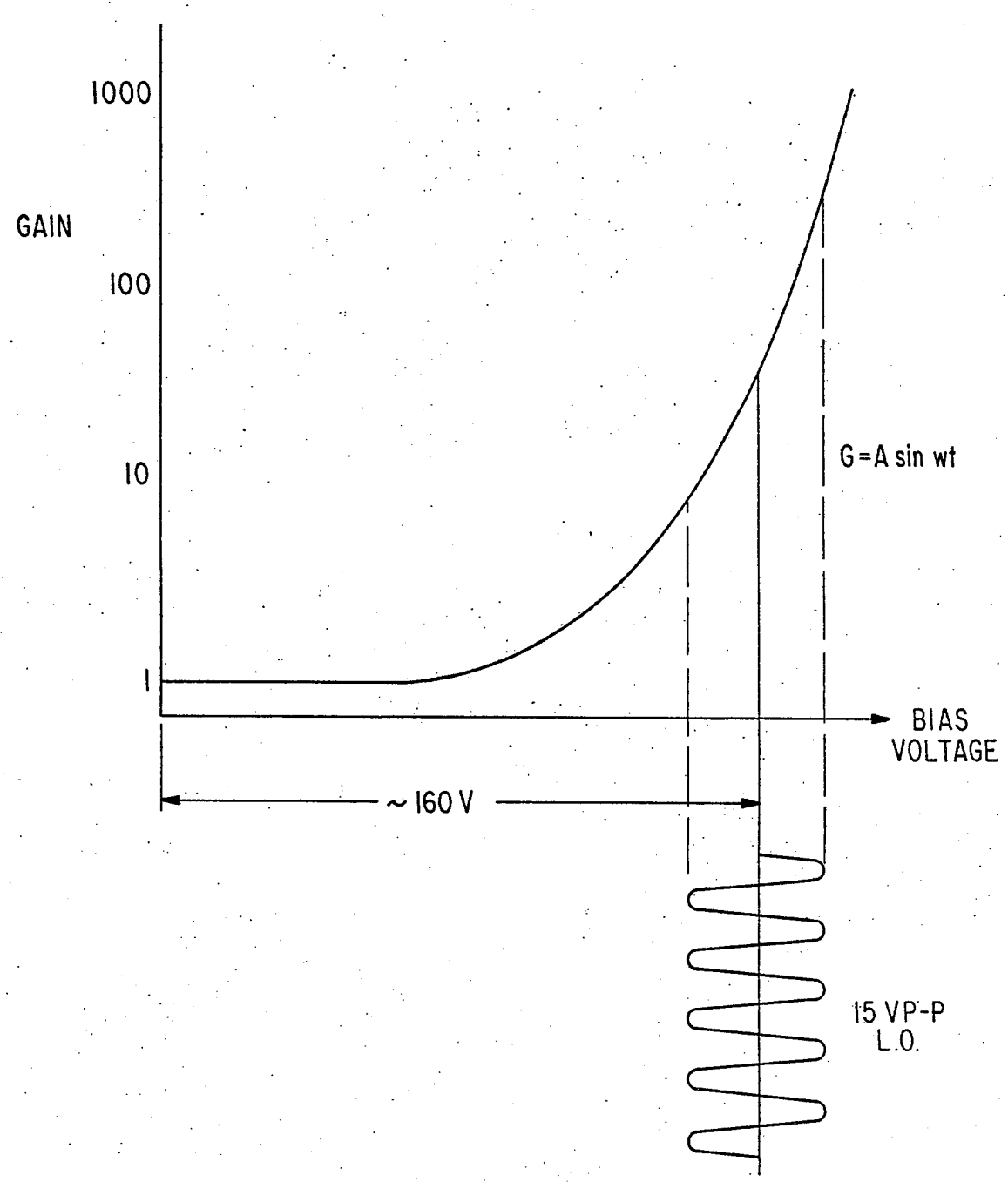
FIG. 16 is a graph of the transfer function of the receiver diode of FIG. 15.

The distance module 75 of the present invention utilizes a technique known as phase comparison, which is the subject matter of U.S. Pat. No. 3,619,058 issued to William R. Hewlett et al, Nov. 9, 1971. A more recent implementation of this technique is described in an article entitled "Electronic Total Station Speeds Survey Operations", by Michael L. Bullock and Richard E. Warren in the April, 1976 issue of the Hewlett-Packard Journal. The present distance measuring module comprises a transmitter, a local oscillator, optics, balance and beam break circuitry, and a receiver. Transmitter 280 of the present invention, shown in FIG. 15, comprises a 15 MHz crystal oscillator 285 and a series of dividers coupled thereto for producing reference frequencies of 15 MHz, 375 KHz, 3.75 KHz and 375 Hz. The 375 Hz is used to drive the sinusoidal track photosources and the radial slit track photo-sources in the theodolite module. One of the three higher frequencies is selected by the processor via 'lion' line inputs to the frequency select circuitry 290 which are coupled to the processor. The selected modulation frequency is input to the laser control circuitry 295 for modulation of the Gallium-Arsenide laser diode 300. The laser diode 300 generates a beam in two directions. One beam is transmitted out of the transmitter module, the second beam is sensed by sensor 305, which is incorporated in a feedback control loop for controlling the operating power level of the laser. The outgoing beam goes through chopper 310 which alternately sends the beam along external and internal paths. The external path sends the beam to a cube corner 315 and back, then through an interference filter 320 which passes only the selected infra-red signal to the receiver 325. The internal path sends the beam through a variable density attenuator 330 and directly into the receiver 325. The receiver diode 335 in the receiver 325 is a photo-avalanche diode. The receiver diode 335 has a gain which is a function of the reverse bias voltage applied to the diode. These characteristics are illustrated in FIG. 16. As shown, the receiver diode has a gain of approximately 1 at low reverse bias voltages. Increasing the voltage bias increases the gain to approximately 1000 before the diode goes into breakdown. The receiver diode accomplishes three functions in the present embodiment. First, the receiver diode demodulates the infra-red beam. Second, the receiver diode mixes the received signal with a local oscillator signal produced by local oscillator driver 340. Third, the receiver diode amplifies the incoming signal an average of about 75 times. The local oscillator frequency is derived from the local oscillator module 340 and is selected so that the output from the receiver diode will always have a 3.75 KHz component. When the laser is modulated at 15 MHz by the transmitter module the local oscillator is driven at 3.75 KHz above the 15 MHz laser modulation. When the laser is modulated at 375 KHz the local oscillator is again driven at 3.75 KHz above the laser modulation. When the laser is driven at 3.75 KHz no mixing is required to produce the 3.75 KHz output from the receiver diode.

The local oscillator module 340 produces the two required local oscillator frequencies by means of two phase-locked loops. The first phase-lock loop comprises a voltage controlled oscillator 345 which will be controlled to oscillate at 3.75 KHz above the 15 MHz reference. The output from the voltage controlled oscillator 345 is mixed with the 15 MHz reference signal from the transmitter module in mixer 350 and the difference frequency is compared in phase detector 355 with the 3.75 KHz frequency from the transmitter 280. The output of the phase detector 355 is low passed filtered and input to the voltage controlled oscillator 345 to lock the output of the voltage control oscillator at exactly the desired frequency. The second phase lock loop comprises a voltage controlled oscillator 360 which is to be locked at a frequency 3.75 KHz above 375 KHz. This is done by dividing the output of the phase voltage controlled oscillator 360 with a 101:1 divider 365. This divided frequency is locked to the 3.75 KHz signal from the transmitter module in phase detector 370. The output of the phase detector 370 is low passed filtered and is used to control the voltage controlled oscillator 360. The output of the voltage controlled oscillator 360 is thereby locked at a frequency exactly 101 times the 3.75 KHz reference. The local oscillator frequency selector 372 is controlled by the processor to apply either the 15 MHz+3.75 KHz frequency or the 375 KHz+3.75 KHz frequency to the local oscillator driver 375 in the receiver module 325. The 3.75 KHz output of the receiver diode 335 is passed through a low noise amplifier 380, low pass filtered in low pass filter 385 and input to an automatic gain control amplifier 387 which insures that the output voltage of the receiver circuitry will always be about 2 volts peak-to-peak, as is the output from the theodolite module. Two narrow band-pass amplifiers 390 and 395 insure that only the 3.75 KHz components are output from the receiver module 325.

The peaks of the output of low noise amplifier 380 are sampled by two comparators 381 and 383. If an overload signal is detected, such as would be caused by holding a cube reflector directly in front of the instrument, comparator 381 will reduce the D.C. bias on receiver diode 335 to reduce the nominal gain to approximately 20. If the overload is still in existence even with the reduced receiver gain, comparator 383 inhibits the GOODFLG. This will turn off the DIST light on the output display indicating to the operator that an attenuator is required in the beam path.

The processor accepts distance measurements, samples and averages the sample values and computes the variance from the value of the sample mean. If the variance is within limits, the processor will display the sample mean. If not, the processor will request more samples. If after 160 samples on the lowest frequency the variance is still out of limits the reading is aborted and a flashing zero is displayed. The same test is made upon middle and high frequency samples, however the high frequency is allowed 320 samples to come within the variance limits.

The laser control circuitry 295 is shown in more detail in FIG. 15b.

Balance and Beam Break Circuitry

Figure 15A:
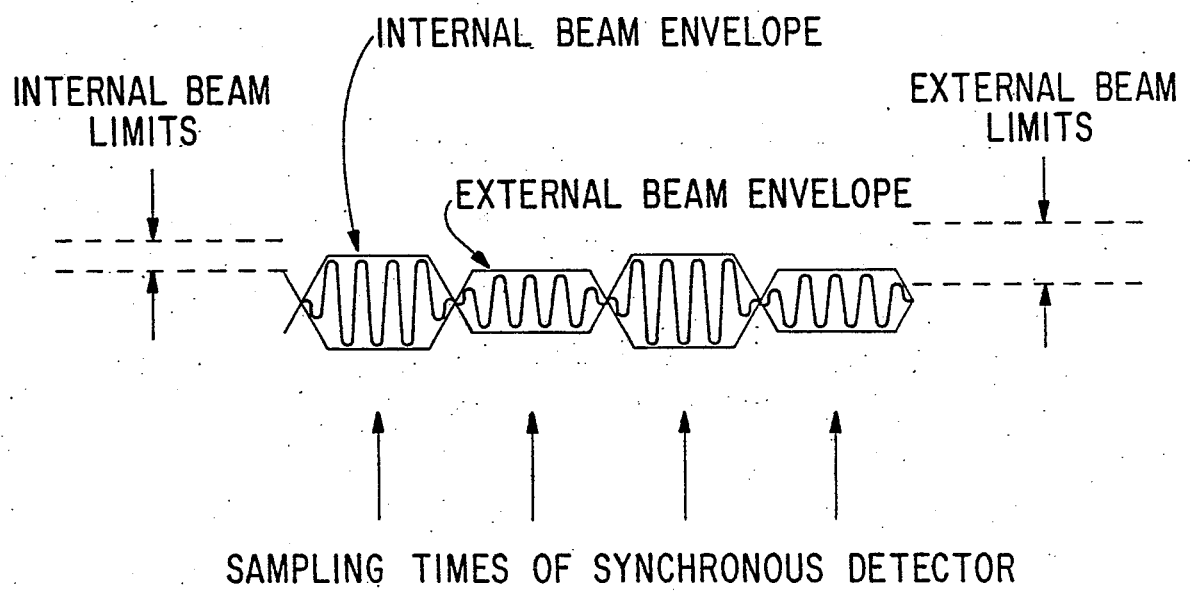
FIG. 15aa is a power consumption chart.
Figure 15:
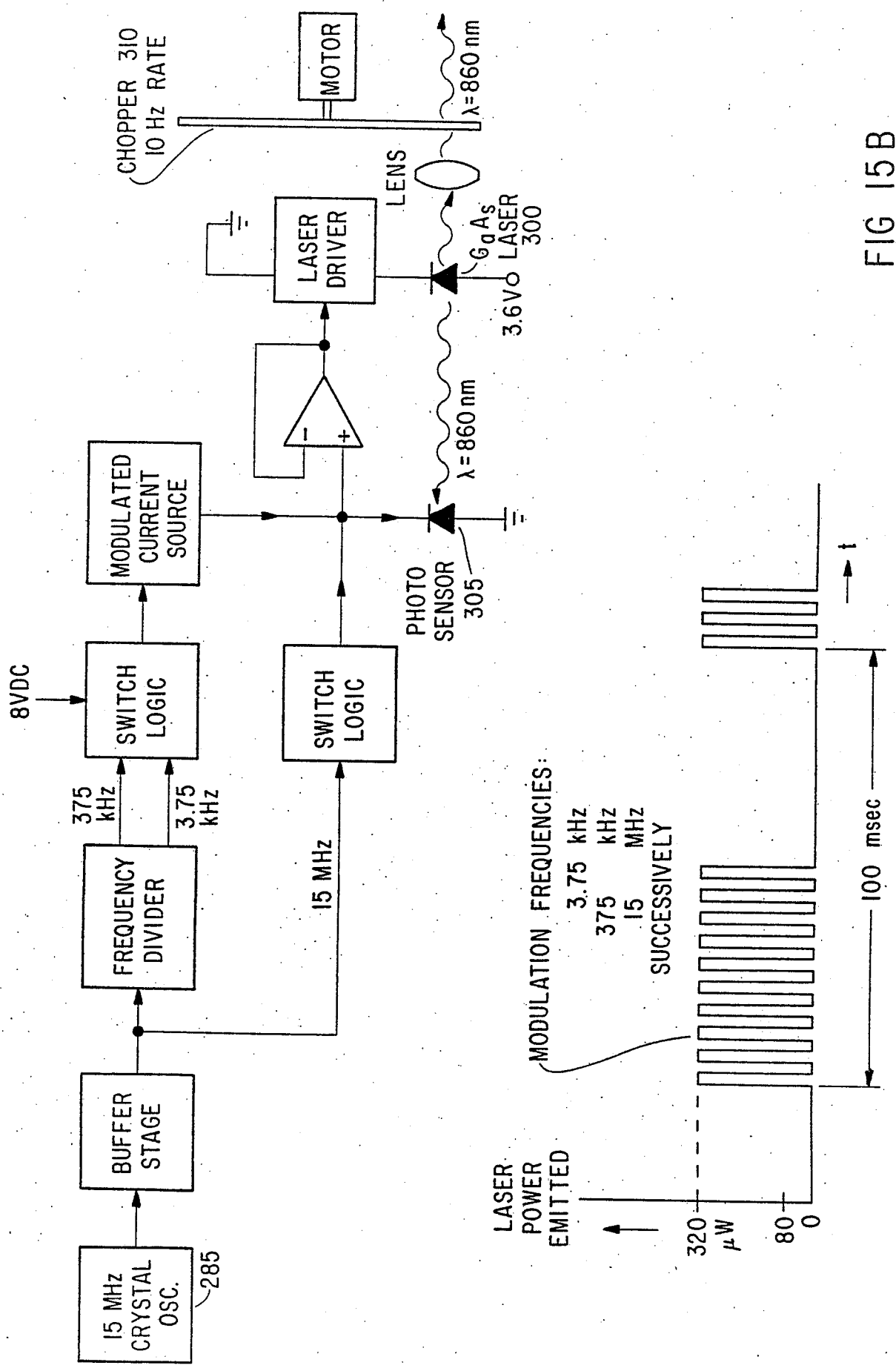

The balance and beam break circuitry 600 controls the intensity of the internal beam, the accumulation of data, and indirectly controls the automatic gain control. The output signal from the receiver 325 is illustrated in FIG. 15a. Envelope detector 605 measures the maximum amplitudes (the envelope) of the receiver output as shown in FIG. 15a. When gate 610 is active, the internal beam balance circuitry is enabled. Synchronous detector 615 samples the output of envelope detector 605 at times synchronized with the beam switching. In turn, the synchronous detector drives meter 620 to adjust the variable attenuator 330 to equalize the internal and external beam envelopes.

Limit detector 625 determines whether the internal and external beam envelopes are within predefined limits. Upon detection of an out-of-limit condition a signal is transmitted to logic module 630. The logic module 630 controls the gate 610, the "GOODFLG", and interacts with the processor to control the AGC-DISQ flag as follows.

Figure 15C:
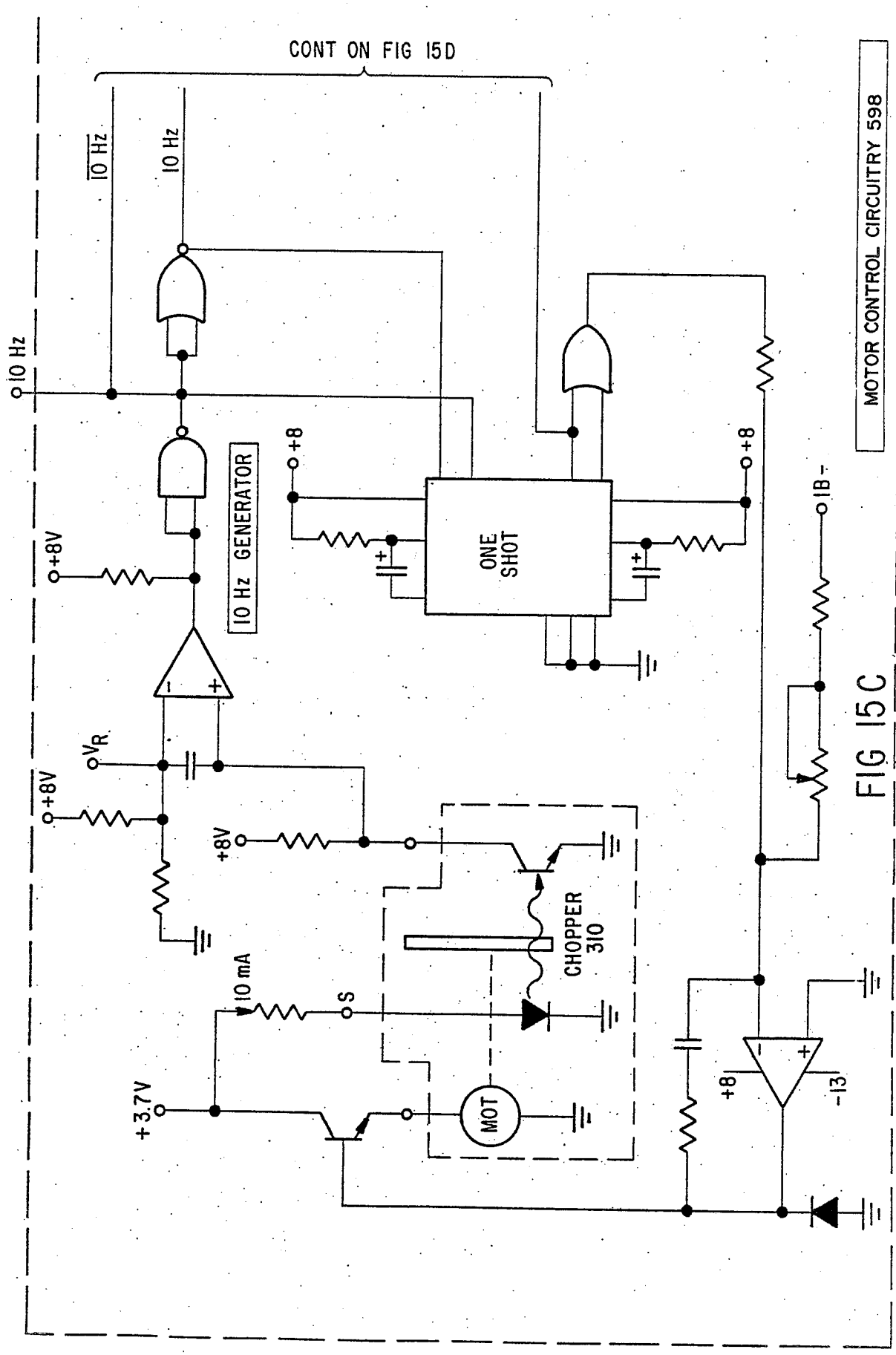
FIG. 15c is a detailed schematic of chopper 310 and the motor control circuitry of FIG. 15.

Three types of beam breaks can occur, and we categorize these as a "fast" beam break, such as a speeding car momentarily breaking the beam, a "long" beam break, such as a cow grazing in the beam, or a "slow" beam break, such as fog slowly attenuating the external beam. In the case of a "fast" beam break the external beam goes outside of its limits, and the "GOODFLG" signals the processor to ignore the affected measurement cycle. In the case of a "long" beam break the balance is held, however, the AGC is adjusted to center the internal beam within its limits. When the grazing cow moves out of the beam the external beam will again be within limits and the "GOODFLG" will signal the processor to start a measurement. In the case of a "slow" beam break the balancing circuitry can equalize the internal and external beam strengths. The internal beam limits have a smaller tolerance than the external beam so that if the fog continues to roll in and attenuate the signal the internal beam limit is triggered. This results in the correction of the AGC gain and the measurement is restarted. If the processor does not receive a "GOODFLG" in 10 seconds (3 if tracking) the instrument goes to a standby mode. This produces a 10% laser duty cycle on laser 300 which conserves power and laser lifetime. The different limits upon internal and external beams, the continued balancing of internal and external beams, the balance hold and AGC update during "long" beam breaks, and the AGC update on "slow" beam breaks provides an instrument with improved measurement and tracking capabilities. A detailed schematic of the balance and beam break circuitry and of the chopper 310 control circuitry is illustrated in FIG. 15C. Note that the 10 Hz signal indicates whether an internal or external beam is presently being processed and proper ranges are accordingly selected by limit detector 625.

Phase Detector

Figure 17:
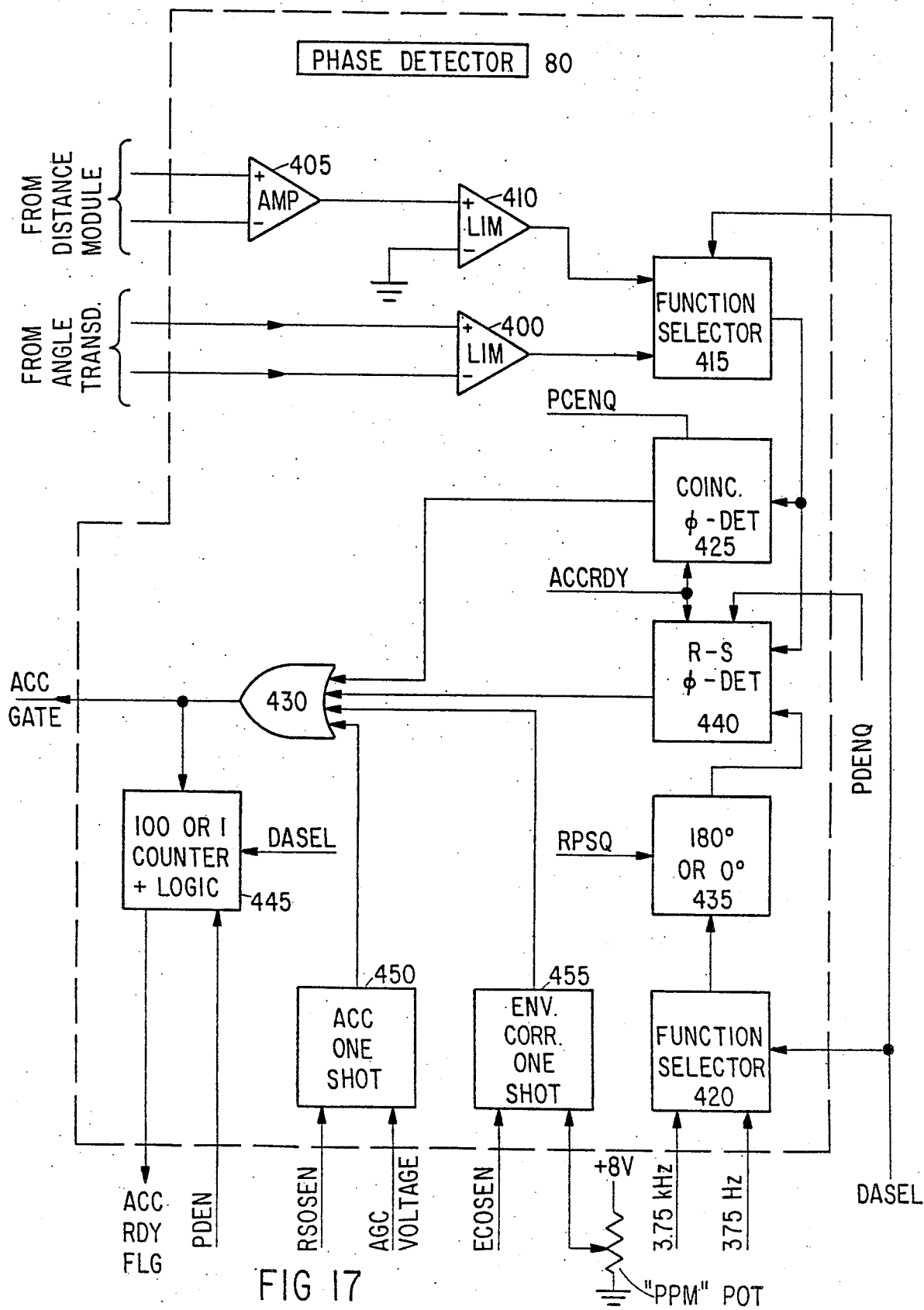
FIG. 17 is a block diagram of the phase detector of FIG. 2.

As explained in the discussion of the theodolite module 90 and the distance module 75, both the angle information and the distance measuring information are now encoded as phase shifts on a periodic signal. A phase detector 80 as illustrated in FIG. 17 is constructed in accordance with U.S. Pat. No. 3,900,259 entitled TIME INTERVAL PHASE DETECTION IN DISTANCE MEASURING APPARATUS issued to Claude M. Mott and Richard J. Clark, Aug. 19, 1975. A differential input from the theodolite module 90 is input to limiter 400 to construct a squarewave for comparison with a reference signal. The output received from the receiver 325 is input to a low offset amplifier (a zero crossing detector) 405 which is then coupled to limiter 410 to also produce a squarewave for comparison to an appropriate reference signal. Function selector 415 is controlled by the processor to select either the input from the distance measuring module or from the theodolite module. This same control also controls function selector 420 which selects the appropriate reference frequency, either 3.75 KHz squarewave for the measurement of distance or a 375 Hz squarewave for the measurement of angles. The signals from function selector 415 are then applied to a coincidence phase detector 425 to determine whether the phase angle detected is close to 360°. Since the distance measuring determination as well as the level sensor angle determinations require an averaging of a number of input signals, operating close to 360° phase shift may introduce an error due to averaging of signals from different cycles. If such is the case, the coincidence phase detector 425 will provide a signal through the processor through OR gate 430 and the accumulator 85, and an 180° phase shift will be introduced to the reference signal in module 435 to avoid any possible averaging errors. Subsequent to the determination of whether the 180° phase shift is required, the input signal from function selector 415 and the reference signal from function selector 420 are input into the phase detector 440, which is simply a set-reset flip-flop. This will hold the accumulator gate high for a period of time proportional to the phase difference between the input and the reference signals. Counter logic 445 counts the number of phase measurements which have been made and outputs a signal upon the detection of the 100th phase measurement to the processor when measuring distance or the first phase measurement when measuring angle. The AGC one shot 450, and the environmental correction one shot 455, can also be selected to input to OR gate 430. These function as simple analog/digital converters. These one shots output a pulse corresponding in length to the voltage applied thereto, which provides a convenient means for interfacing with the processor. The selection of which of the four measurement is to be input to OR gate 430 is controlled by "LIONS" lines from the processor. Only one of the inputs to OR gate 430 is active at a time.

Processor and Display

Figure 18:
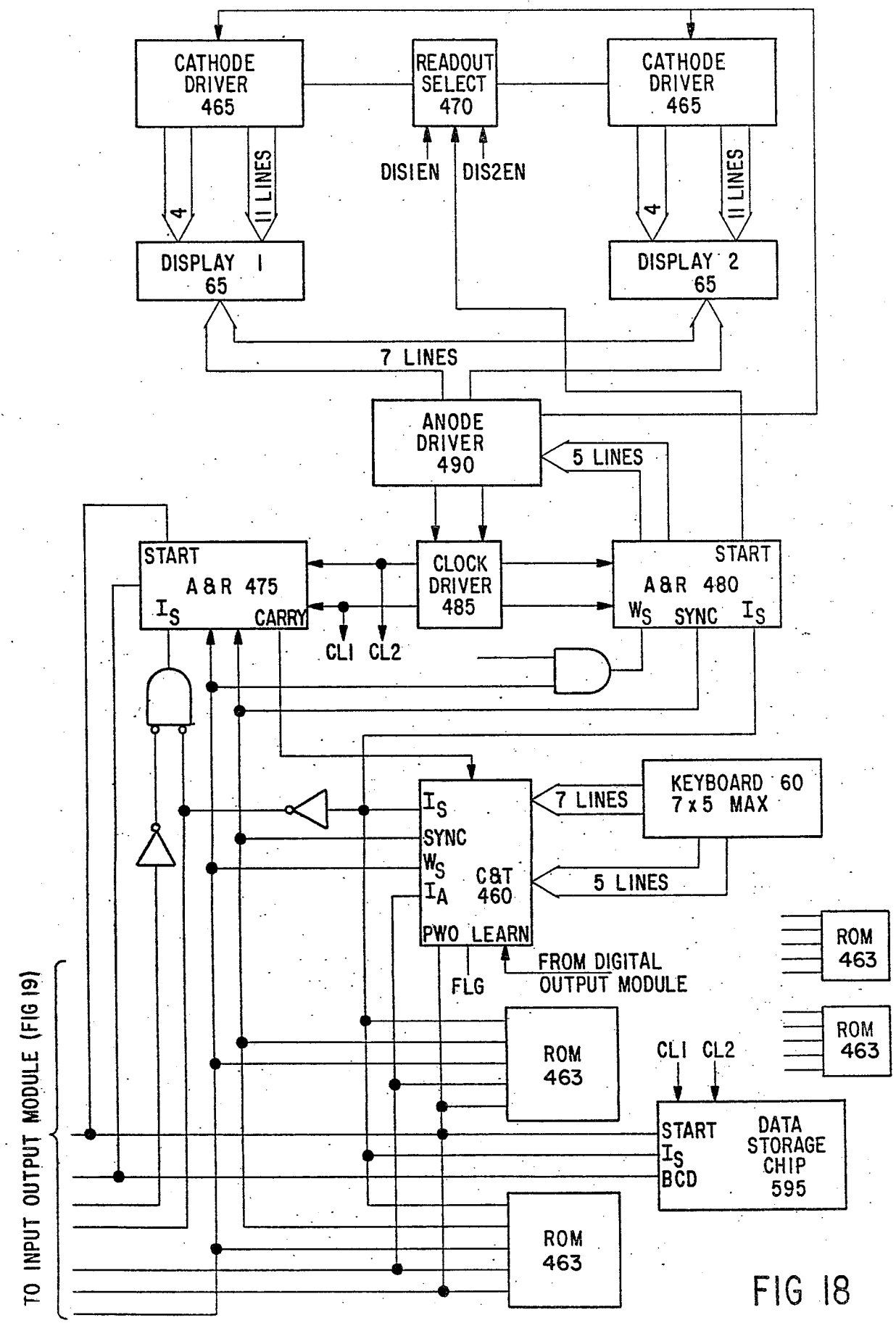
FIG. 18 is a block diagram of the processor and displays of the tacheometer of FIG. 2.

The processor 100 and the displays 110 shown in FIG. 18 are substantially the same as those used in the handheld calculators designated the HP35 and the HP80 manufactured by the Hewlett-Packard Company, Palo Alto, California. These are described in U.S. Pat. No. 3,863,060 entitled GENERAL PURPOSE CALCULATOR WITH CAPABILITY FOR PERFORMING INTERDISCIPLINARY BUSINESS CALCU- LATIONS, issued to France Rode et al on Jan. 28, 1975. A control and timing chip "C&T" 460 is coupled to the keyboard 60 by a 7×5 line matrix. This limits the number of possible keys to 35. In the present invention only 24 of the possible key functions are utilized, 12 on each of the two keyboards. Four quad read-only memories (ROMs) 463 are coupled in parallel to the C&T 460. Two cathode drivers 465 are used to drive the output displays 65. The read-out select 470 determines which of the cathode drivers 465 is active. Two arithmetic and register circuits 475 and 480 are incorporated. One is totally dedicated to run the readout display and another is dedicated to computations. This allows the instrument to do its computations while maintaining a simultaneous display. A data storage chip 595 contains 10 registers for storage of temporary and semipermanent calculations. This allows the "RECALL" function to operate as described in the KEYBOARD section. Two registers are used as scratch registers. Registers 1 and 6 are updated only by direct inputs. The remaining six registers are erased prior to each measurement. In general, the register contents correspond to the key stroke numeral as shown in Table 1.

TABLE 1

| Register | Contents |
|---|---|
| 0 | Scratch |
| 1 | SIG/PPM |
| 2 | Level Readings (2) |
| 3 | Slope Distance |
| 4 | Projected Horizontal Distance |
| 5 | Projected Verticle Displacement |
| 6 | Direction (Horizontal Angle) |
| 7 | Zenith (Vertical Angle) |
| 8 | Scratch |
| 9 | Relative Direction |

The system architecture of the processor 100 and a detailed description of the C&T circuit 460, the read-only memories 463, the A&R circuits 475 and 480, the clock driver 485, the anode driver 490, the cathode drivers 465, and a supplemental description of the keyboard 60, the output displays 65, and the instruction set for the processor is given in the above mentioned patent issued to France Rode et al. The program sequences programmed into the 4 quad ROMs 463 control the instrument operation in response to keyboard inputs and the other instrument inputs. Listings of these sequences as well as further discussion of the processor instruction set are provided in the section entitled DETAILED SEQUENCES.

Accumulator and Input/Output Module

Figure 19A:
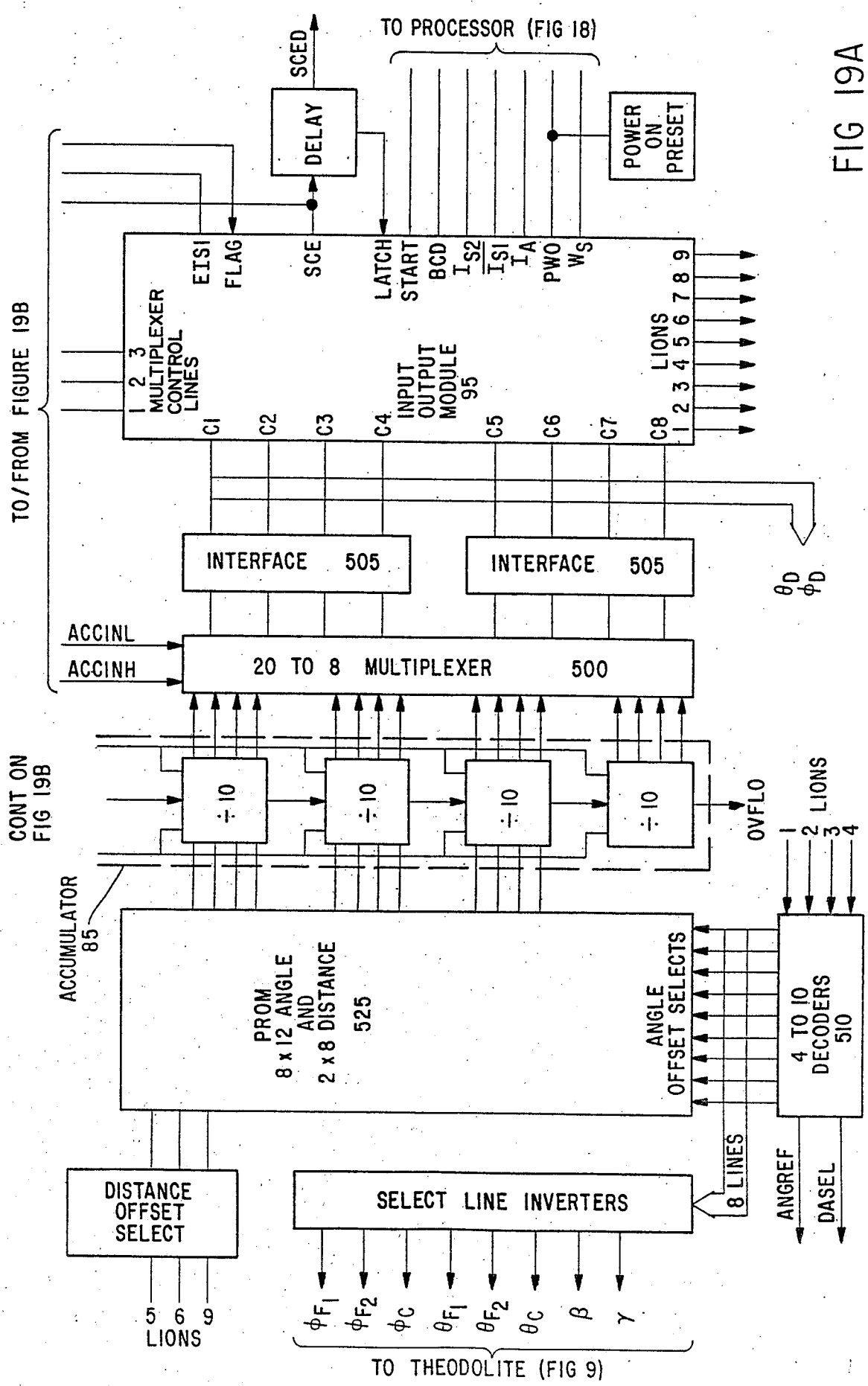
FIGS. 19A and 19B are block diagrams of the accumulator and input output module of FIG. 2.
Figure 19B:
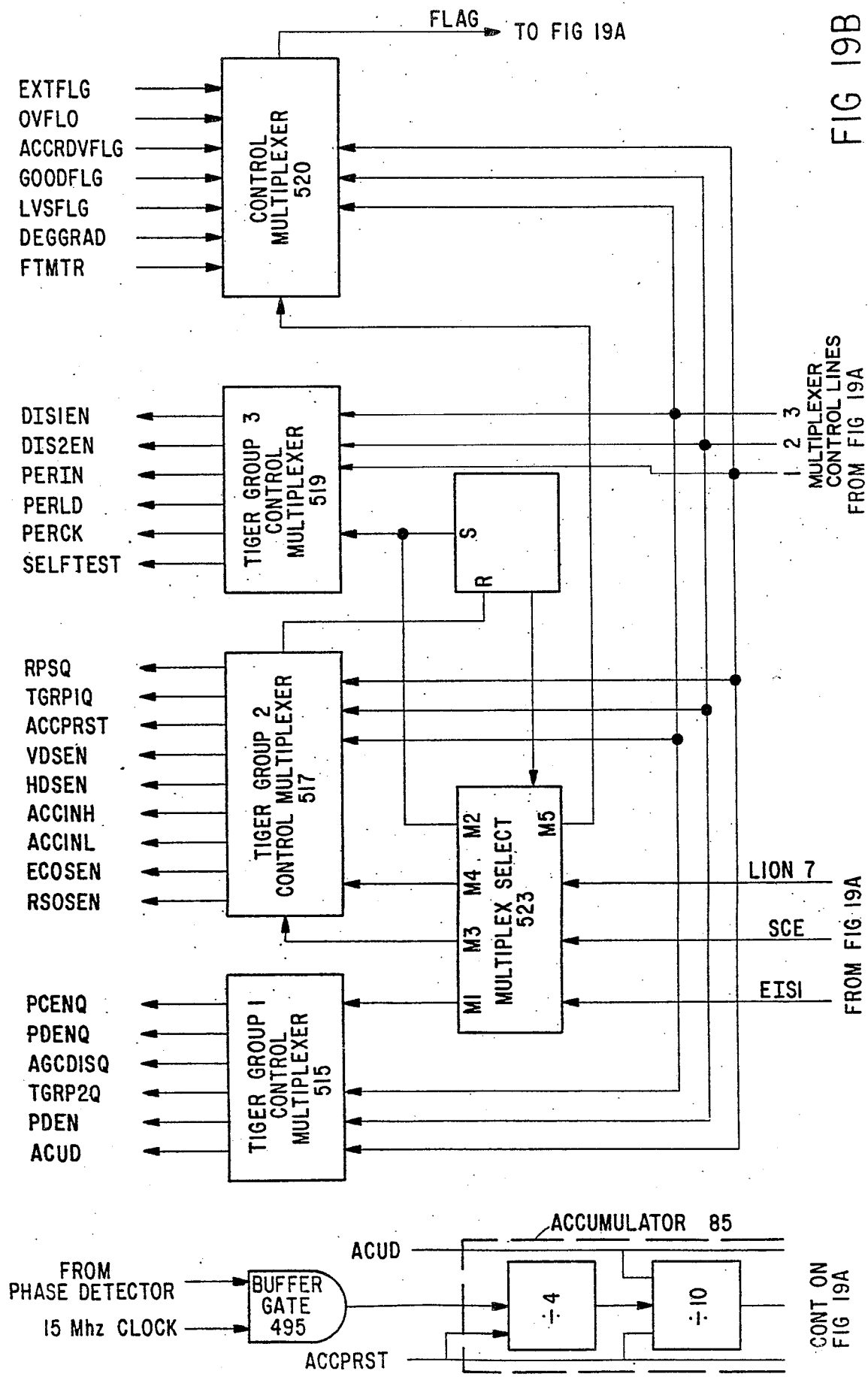

The "grand central station" of the tacheometer is the input/output module 495 of FIG. 19. This module provides the interface between the processor 100 and the measurement modules. This input/output module 95 was originally developed for the HP9805 Desk Top Calculator to interface with a printer and is further described in the co-pending patent application entitled ADAPTABLE PROGRAMMED CALCULATOR HAVING PROVISION FOR PLUG-IN KEYBOARD AND MEMORY MODULES, Ser. No. 318,451 filed Dec. 26, 1972 by Freddie W. Wenninger et al. The input/output module 85 performs basically three functions. The module excepts the data from the accumulator 85, controls the instrument via "lion" and "tiger" lines and interrogates instrument status via "flag" lines.

As explained above, the basic instrument measurements are output by the phase detector 80 in the form of timed pulses. This output is applied to buffer gate 495 to gate a 15 MHz clock. A number of clock pulses proportional to the duration of the time pulse from phase detector 80 is measured by the accumulator 85. When the timed pulse terminates a BCD number will be stored in the five-decade counters of the accumulator 85. Since the input/output module 95 can accept only 8 input lines, the accumulator output is multiplexed into the input/output module via multiplexer 500, reading first the 8 least significant bits, then the most significant bits sequentially into the input/output module. The interface circuitry 505 is required to adapt the CMOS logic of the tacheometry circuitry to the $T^2L$ logic of the input/output module 95 interface. The input/output module 95 now communicates with the C&T 460 and A&R 475 for computations and sequence control. This allows data to be entered electrically through the processor and A&R chip in addition to processor control by the keyboard 60.

Instrument control is accomplished via the 9 "lion" lines. The function of the lions lines are shown in Table 1.

TABLE 1

| | |
|---|---|
| LIONS 1-4 | Control Decoder 510 For Selection Of Theodolite Measurements, Angle or Distance Selection, and Selects PROM Initialization Constants For Angles and Levels. |
| LIONS 5-6 | Transmitter Frequency Select and Selects PROM Initialization Constants For Distance. |
| LION 7 | Peripheral and Display Control Line Selector. |
| LION 8 | Level Limit Indicator. |
| LION 9 | PROM Enable For Distance Measurements. |

The lions lines 1-4 control the 8 select lines to the theodolite module 90 via the 4 to 10 decoder 510 and select angle or distance functions. The frequency selector and the local oscillator selector in the distance measuring module are controlled by two more lions lines.

The 3 "multiplier control lines" outputs combined with the SCE line provide short pulses which last less than one instruction cycle time. These are used for short controls or interrogations. For instance, the digital track photo-source 200 in the vertical shaft encoder 210 of the theodolite module 90 requires only short discharges of a capacitor for current pulses through the Gallium Arsenide photo-sources. Control multiplexers 515, 517 and 519 multiplex the tiger lines. Multiplex selector 523 enables one of the control multiplexers via lines M1-5. This provides an effective capability of controlling many tiger lines. The functions of the tiger lines thereby obtained are described in Table 2.

TABLE 2

| | (Q means "latched") |
|---|---|
| Group #1 | TIGER LINES |
| PCENQ | Phase Coincidence Detector Select. |
| PDENQ | Phase Detector Select. |
| AGCDISQ | ACG Disable. |
| TGRP2Q | Tiger Group 2 Select. |
| PDEN | Phase Detector And Phase Coincidence Detector Enable. |
| ACUD | Accumulator Count Up Or Down. |
| Group #2 | TIGER LINES |
| RPSQ | Reference Phase Shift To Phase Detector. |
| TGRP1Q | Tiger Group 1 Select. |
| ACCPRST | Accumulator Preset (From PROM). |
| VDSEN | Vertical Digital Sensors Enables. |
| HDSEN | Horizontal Digital Sensors Enables. |
| ACCINH | Read Higher Order Accumulator Bits. |

TABLE 2-continued (Q means "latched")

| | |
|---|---|
| ACCINL | Read Lower ORder Accumulator Bits. |
| ECOSEN | Environmental One Shot Enable. |
| RSOSEN | Return Strength (AGC) One Shot Enable. |
| Group #3 | TIGER LINES |
| DIS1EN Display 1 Enable. | |
| DIS2EN | Display 2 Enable. |
| PERIN | Peripheral Input. |
| PERLD | Peripheral Load. |
| PERCK | Peripheral Clock. |
| SELFTEST | Self Test Activate. |

The final communication between the input/output module and the instrument is via the flag lines. An example of a flag line is the range sensor line LVSFLG from the level sensor module 215 in the theodolite. The input/output module has the capability of interrogating only a single flag line at a time. The control multiplexer 520 multiplexes the various flag lines into the input/output module flag input. The flag inputs are described in Table 3.

TABLE 3

Flags:

| | |
|---|---|
| EXTFLG | Chopper Syncronization Flag. |
| OVFLO | Accumulator Overflow. |
| ACCRDYFLG | Measurement Complete (Read Into Processor). |
| GOODFLG | No Beam Break Detected. |
| LVSFLG | Level Sensor Within Range. |
| DEGGRAD | From Auxiliary Control Panel. |
| FTMTR | From Auxiliary Control Panel. |

The PROM 525 is used to provide offset constants for the distance and angle measurements. Once the instrument is assemblied, the offsets are measured and programmed into the PROM 520. These are used to preset the decade counter automatically prior to any distance or angle measurements.

The processor can provide a digital output of the contents of the display plus certain status bits. This output can be manually activated by pressing the output key or automatically activated by pressing the following key sequence: TRK+OUTPUT+KEY 1,2,3,4,5,6,7,8 or 9. In the manual case a single reading will be output after each measurement is made. The output is accomplished via a five wire interface. There are two flag lines, a ground line, a clock line and a data line. The data consists of 14 BCD digits in a 56 bit serial stream.

Optics

Figure 20:
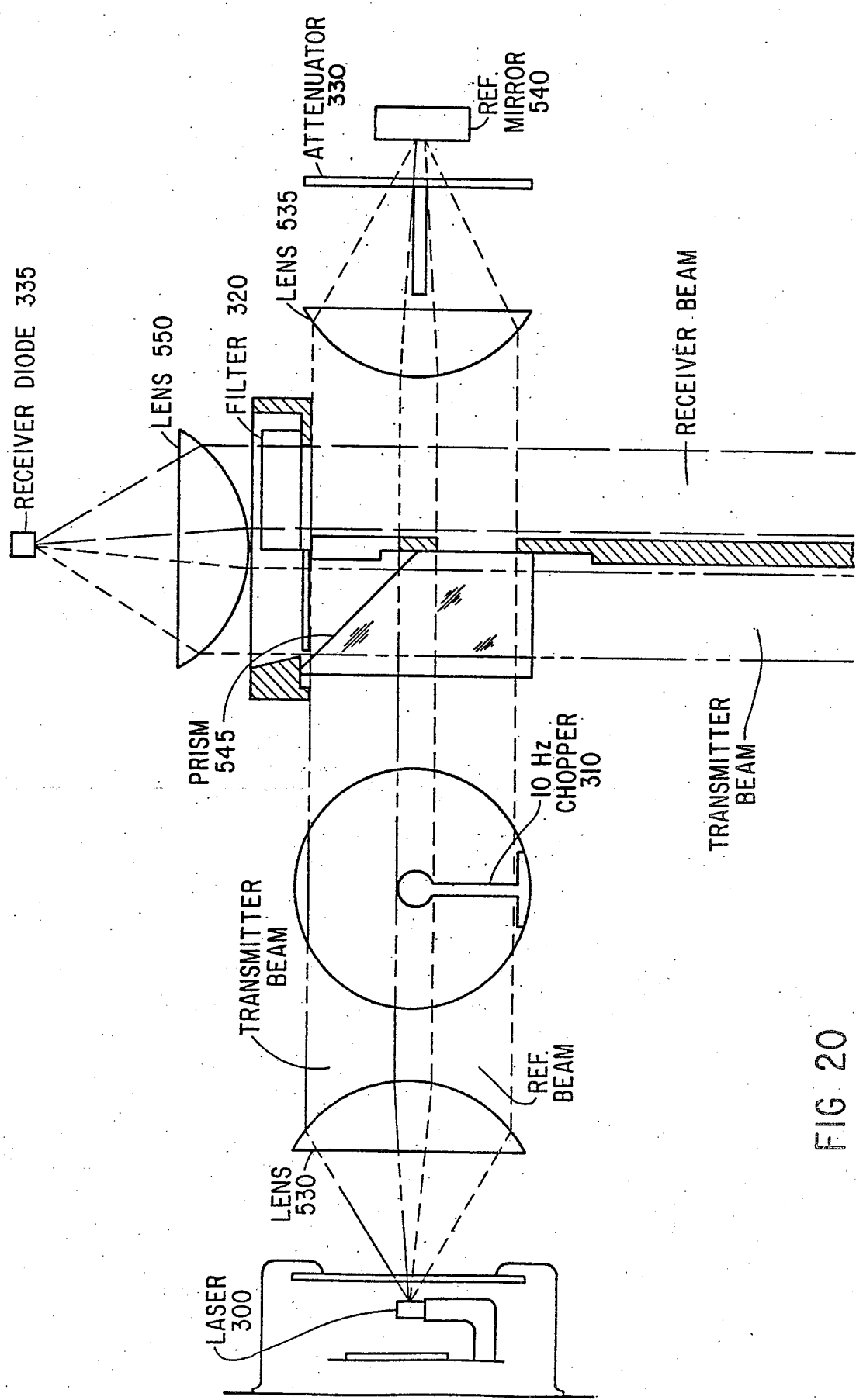
FIG. 20 is an illustration of transmitter and receiver optics of the distance module of FIG. 15.
Figure 21:
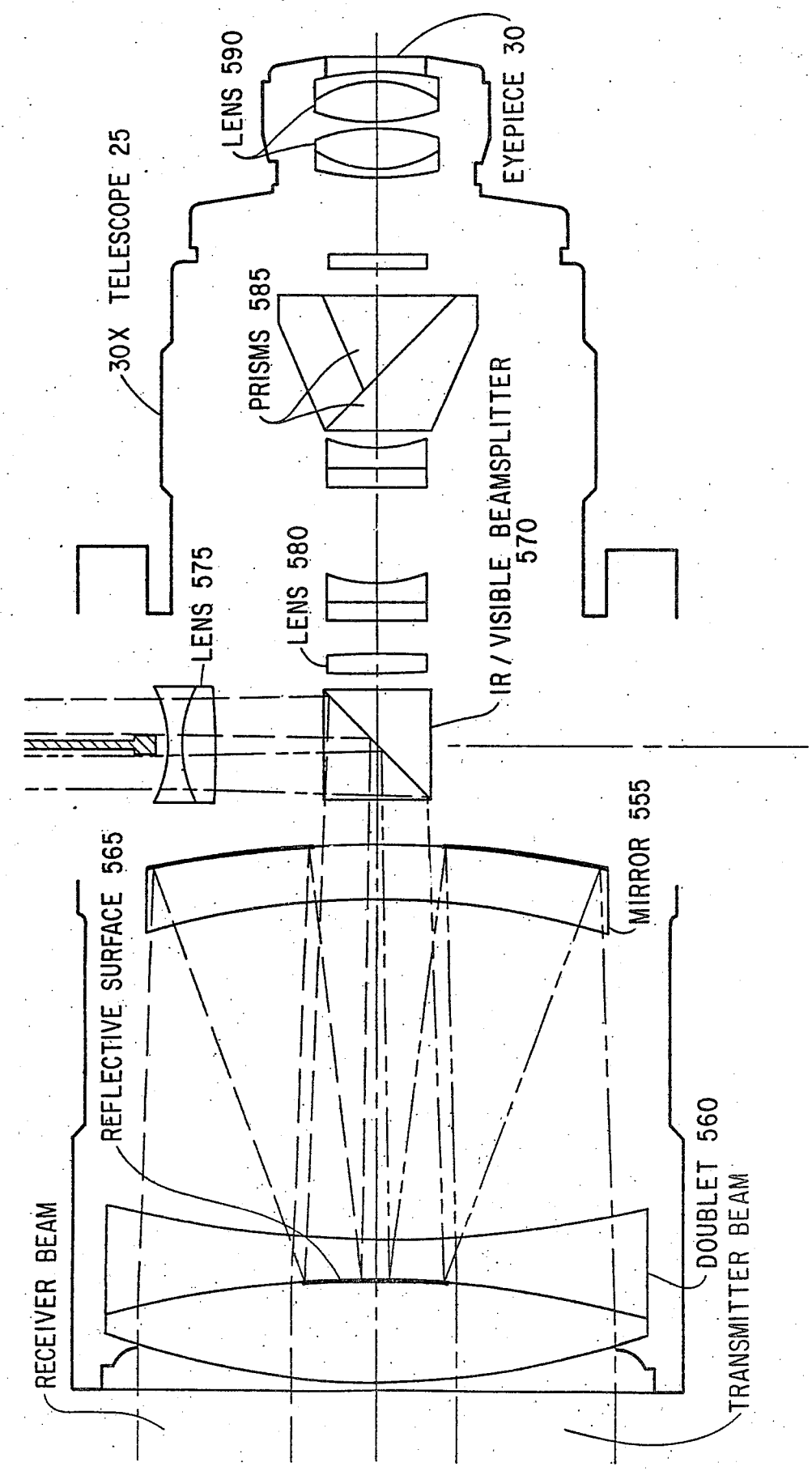
FIG. 21 is an illustration of telescope optics of the distance module of FIG. 15.

The optics incorporated in the distance measuring module are illustrated in FIGS. 20 and 21. Referring to FIG. 20, a beam of light is emitted from laser 300 and collimated by lens 530. Chopper 310 alternately interrupts the internal and the external beams so that only one of the beams arrives at receiver diode 335 at a time. The beams are split into a reference beam and a transmitted beam by prism 545. The reference beam is focused by lens 535 upon mirror 540, recollimated by lens 535, reflected from the back surface of prism 545, and focused by lens 550 upon the receiver diode 335. The transmitted beam from chopper 310 is reflected off the front surface of reflector 545. This beam is collimated and will exist side by side with the collimated received beam which passes through filter 320 and is focused by lens 550 upon the receiver diode 335. The side by side existence of the collimated transmitted and received beams allows this assembly to be interfaced conveniently with telescopes having various powers. The present 30× power telescope 25, illustrated in FIG. 21, comprises two spherical components. The second surface mirror 555, also called a Mangin mirror, is the main power of the telescope. A slightly negative lens element on the second surface mirror 555 is used to correct for spherical abberation from the spherical reflective surface. Doublet 560 is a convergent meniscus lens comprising a biconvex element and a biconcave element, the biconcave element facing the second-surface mirror 555, both elements made out of material having the same index of refraction. The primary function of the doublet 560 is to correct for coma (off-axis) abberations. The doublet 560 has a reflective surface 565 interposed between the lens elements. The doublet has a slightly positive power. This slightly positive power provides color correction for the negative refraction power associated with the second surface mirror 555. Since the main power of the telescope is in the mirrors, and very little power is in the glass lenses, there is no significant color abberation. The side by side transmitted receiver beam is reflected off the beam splitter 570. A negative lens 575 collimates the beams for interface with the optics of FIG. 20. The beam splitter 570 allows a significant portion of the optical wave lengths to pass through there and eventually into the operator eyepiece 30. A small positive lens 580 increases the focusing range and allows the telescope to be focused to 5 meters. The prisms 585 are used to revert and invert the image. Since the field of view is 1.5°, and the power of the telescope 30×, the field of view at the eyepiece is 45°. This requires the use of two doublets 570 in the eyepiece to obtain sufficient off-axis correction thus keeping the entire field in focus. The use of the concave Mangin mirror having negative refraction element and the convergent meniscus lens provides a short telescope having good spherical, color and coma correction, and having a large aperture. All of the optical surfaces are spherical which provides a simple to manufacture device as well.

The telescope is gimbaled so as to have a "plunging" capability. This refers to rotating the telescope through vertical to a position 180° horizontally from a first position without moving the horizontal shaft. This allows an operator to take two sights, forward and back, from a single position and thereby compensate for any eccentricity in the vertical gimbal of the theodolite. This technique provides for every high angular resolution when combined with the present instrument. This feature is combined with dual keyboards to allow the operator to control instrument sequences during both measurements.

We claim:

1. A shaft angle encoder comprising:
an encoder disc for periodically modulating first and second signals, the signals being modulated as a function of angular displacement;
first, second and third detectors linearly aligned, said first and second detectors having inputs coupled to receive the first signal, said third detector coupled to receive the second signal, each detector having an output, each detector generating a signal upon its respective output responsive to the signal input thereto;
processor means coupled to the outputs of said first, second and third detectors for determining the eccentricity error from signals responsive to the outputs of said first and second detectors, modifying the measurement of the angular displacement determined from said third detector in response to the determined error, and combining angular displacements derived from said detectors to obtain a single angular displacement.

2. A method for correcting eccentricity errors between an encoder disc for periodically modulating first and second signals, the signals being modulated as a function of angular displacement, and first, second and third detectors, the detectors being linearly aligned, the first and second detectors having inputs coupled to receive the first signal, said third detector coupled to receive the second signal, each detector having an output, each detector generating a signal upon its output responsive to the signal thereto, the method comprising:
determining the eccentricity correction from the outputs upon said first and second detectors; and
combining the eccentricity correction and a signal responsive to the output of said third detector to obtain a first order angular displacement.

3. In a shaft angle encoding apparatus in which an angularly encoded element rotates relative to a detector element having a plurality of detectors, the method of correcting for the eccentricity error associated with displacement between the rotational axis of the angularly encoded element and the rotational axis of the detector element comprising the steps of:
detecting angular encoding at linearly aligned first, second and third locations, the first and second locations diametrically opposed and substantially equally distant from the rotational axis of the detector element, the third location at a substantially different distance distant from the rotational axis of the detector element;
algebraically combining the angular detections of said first and second locations to produce a correction factor; and
algebraically combining the correction factor with the detection at said third location to produce a signal representative of the shaft angle corrected for the eccentricity error.

4. In a shaft angle encoding apparatus in which an angularly encoded element rotates relative to a detector element having a plurality of detectors, the method of correcting for the eccentricity error as in claim 3, wherein the third location is between the first and second locations.

5. In a shaft angle encoding apparatus in which an angularly encoded element rotates relative to a detector element having a plurality of detectors, the method of correcting for the eccentricity error as in claim 3 or 4, wherein the step of algebraically combining the angular detections comprises a step of differencing the angular detections of said first and second locations, and the method further comprises the steps of:
averaging the angular detections of said first and second locations to produce an averaged signal; and
algebraically combining the averaged signal with the signal representative of the shaft angle corrected for the eccentricity error to produce another signal representative of the shaft angle.

6. In a shaft angle encoder having an encoder disc for providing periodically modulated first and second signals as a function of angular displacement relative to a means for detecting the signals, an improvement for compensating the encoded shaft angle for the eccentricity error associated with displacement between the rotational axis of the encoder disc and the rotational axis of the means for detecting the signals wherein:
the means for detecting the signals comprises first, second and third detectors linearly aligned, said first and second detectors diametrically opposed at substantially equal distances from the rotational axis of the means for detecting and coupled to receive the first signal, said third detector at a substantially different distance from the rotational axis of the means for detecting and coupled to receive the second signal, each detector having an output, each detector generating a signal on its respective output responsive to the signal received thereby;
first means coupled to the outputs of said first and second detectors for providing an eccentricity error signal in response to the signals generated by the first and second detectors; and
second means for providing a first signal representative of the shaft angle compensated for the eccentricity error in response to the signal generated by the third detector and the eccentricity error signal.

7. An improved shaft angle encoder as in claim 6, wherein the encoder disc comprises first and second concentric circular tracks for providing the periodically modulated first and second signals as a function of angular displacement respectively and the second track has a smaller radius than the first track.

8. An improved shaft angle encoder as in claim 6 or 7, wherein the second track has fewer periods per revolution than the first track.

9. An improved shaft angle encoder as in claim 6 or 7 further comprising:
averaging means coupled to the outputs of said first and second detectors for providing an averaged signal in response to the signals generated by the first and second detectors; and
means coupled to the averaging means and to the second means for providing a second signal representative of the shaft angle compensated for the eccentricity error in response to the averaged signal in the first signal.

10. An improved shaft angle encoder as in claim 6 or 7, wherein the encoder disc has areas of differing optical transmissivity for modulating first and second electromagnetic radiation signals.

* * * * *

UNITED STATES PATENT AND TRADEMARK OFFICE
CERTIFICATE OF CORRECTION

PATENT NO. : 4,335,306
DATED : June 15, 1982
INVENTOR(S) : Alfred F. Gort et al

It is certified that error appears in the above—identified patent and that said Letters Patent is hereby corrected as shown below:

Column 1, line 38, "that" should be --this--;

Column 2, line 36, delete the entire line;

Column 16, line 37, after "the" insert --slightly positive--;

Column 17, line 35, after "distance" delete "distant".

Signed and Sealed this

Seventh Day of September 1982

[SEAL]

*Attest:*

GERALD J. MOSSINGHOFF

*Attesting Officer* — *Commissioner of Patents and Trademarks*